United States Patent
Sonoda et al.

(10) Patent No.: US 8,694,170 B2
(45) Date of Patent: Apr. 8, 2014

(54) GAS TURBINE OPERATION CONTROL DEVICE AND OPERATION CONTROL METHOD

(75) Inventors: Takashi Sonoda, Hyogo (JP); Akihiko Saito, Hyogo (JP); Shinsuke Nakamura, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1108 days.

(21) Appl. No.: 12/670,877

(22) PCT Filed: Nov. 6, 2008

(86) PCT No.: PCT/JP2008/070188
§ 371 (c)(1),
(2), (4) Date: Jan. 27, 2010

(87) PCT Pub. No.: WO2009/060889
PCT Pub. Date: May 14, 2009

(65) Prior Publication Data
US 2010/0198419 A1 Aug. 5, 2010

(30) Foreign Application Priority Data
Nov. 6, 2007 (JP) ................................ 2007-288720

(51) Int. Cl.
*G05D 5/00* (2006.01)
*F02C 9/00* (2006.01)
(52) U.S. Cl.
USPC .......................... 700/287; 700/290; 60/39.27
(58) Field of Classification Search
None
See application file for complete search history.

(56) References Cited

U.S. PATENT DOCUMENTS

| 6,230,479 | B1 | 5/2001 | Kawamura et al. |
| 6,742,341 | B2 * | 6/2004 | Ryan et al. ...................... 60/773 |
| 2003/0011199 | A1 | 1/2003 | Wickert et al. |
| 2004/0055273 | A1 | 3/2004 | Hirayama et al. |
| 2005/0204745 | A1 | 9/2005 | Hirayama et al. |
| 2006/0201132 | A1 | 9/2006 | Hirayama et al. |

FOREIGN PATENT DOCUMENTS

| EP | 1 036 924 A2 | 9/2000 |
| JP | 11-303654 A | 11/1999 |
| JP | 2001-200730 A | 7/2001 |

(Continued)

OTHER PUBLICATIONS

International Search Report of PCT/JP2008/070188, mailing date of Dec. 9, 2008.

(Continued)

*Primary Examiner* — Sean Shechtman
(74) *Attorney, Agent, or Firm* — Westerman, Hattori, Daniels & Adrian, LLP

(57) ABSTRACT

Provided is a gas turbine operation control device and operation control method that are capable of suppressing turbine inlet temperature and of satisfying the demand response for shaft output. An IGV emergency fully-open flag is activated when the output of a generator is in a high load band at or above a predetermined value, and the like. When the IGV emergency fully-open flag is activated, the degree of opening of an inlet guide vane is set to a predetermined degree of opening, a temperature adjustment setting is set by switching in accordance with the degree of opening of the inlet guide vane, and an exhaust gas temperature setting value or a blade path temperature setting value of a turbine, for controlling the fuel supply amount for a combustor, is generated based on the temperature adjustment setting.

12 Claims, 20 Drawing Sheets

(56) References Cited

FOREIGN PATENT DOCUMENTS

| | | |
|---|---|---|
| JP | 2003-206749 A | 7/2003 |
| JP | 2003-239763 A | 8/2003 |
| JP | 2004-27848 A | 1/2004 |

OTHER PUBLICATIONS

A Decision to Grant a Patent, issued on Dec. 5, 2012 in corresponding Chinese Patent Application No. 200880102981.3.

European Search Report dated May 15, 2013, issued in European Patent Application No. 08846945.7.

\* cited by examiner

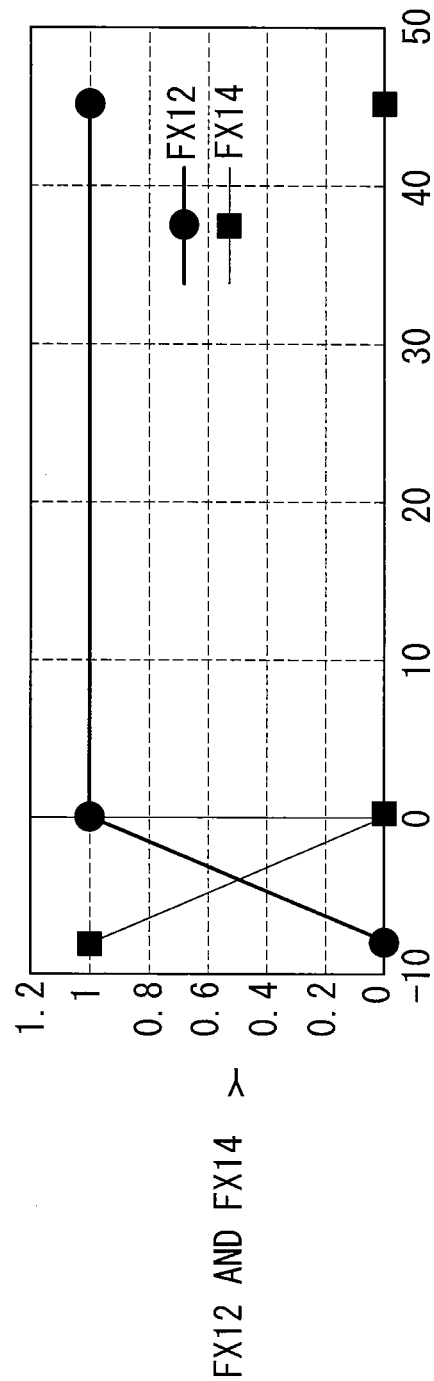

GAS TURBINE OPERATION CONTROL DEVICE AND OPERATION CONTROL METHOD

TECHNICAL FIELD

The present invention relates to a gas turbine operation control device and operation control method, and relates particularly to a gas turbine operation control device and operation control method that are capable of containing a turbine inlet temperature within an overshoot limit range, in response to a frequency fluctuation, and that are also capable of satisfying the Grid Code demand response for the shaft output.

BACKGROUND ART

In general, a gas turbine used in a power plant and the like combusts fuels sprayed into the air compressed in a compressor and gains output by guiding the high-temperature, high-pressure combustion gas obtained as a result to a turbine. A basic configuration of such a gas turbine is shown in FIG. 14. A gas turbine 100 is provided with a compressor 102, a combustor 103, and a turbine 101. The combustor 103 is supplied with air compressed in the compressor 102 and fuel gas whose flow rate is adjusted by a fuel flow rate adjusting valve 105, whose degree of opening is adjusted in accordance with the load. High-temperature combustion gas combusted in the combustor 103 is supplied to the turbine and drives the turbine 101 by expanding therein. This driving force is transmitted to a generator 150 to carry out power generation and is also transmitted to the compressor 102 to drive the compressor.

Note that in the case of a single-shaft combined cycle power plant, individual rotational shafts of the gas turbine 100, the generator 150, and a steam turbine 160 are integrally connected.

In addition, the compressor 102 is provided with an inlet guide vane (IGV) 104 at the front side of first-stage blades thereof. The inlet guide vane 104 is for controlling the temperature of exhaust gas from the gas turbine 104 to a target value by controlling the degree of opening of the guide vane at a compressor inlet, thereby changing the amount of air flowing between the inlet guide vane 104 and the rotor blades of the compressor 102 and flowing into the combustor The intake air is given a velocity in a circumferential direction by the inlet guide vane 104 and is introduced into the compressor 102. In the compressor 102, the pressure of the introduced air increases, gaining energy as it passes through multiple stages of rotor blades and stator blades.

Note that the inlet guide vane 104 is constituted of a number of movable blades that are provided in the circumferential direction and that are supported so as to be individually movable; and actuators operated based on driving signals from a controller 110 move these movable blades, thereby adjusting the intake air flow rate and the combustion temperature.

More specifically, the controller 110 has a configuration as shown in FIG. 15 in order to generate an IGV degree-of-opening command 115 for the actuators of the inlet guide vane 104. In other words, it is configured to include a multiplier 11, a table function unit (FX1) 12, a limiter 13, a correction function unit (FX2) 14, and a limit function unit (FX3) 15. Basically, the IGV degree of opening is set based on a function shown in FIG. 16A in accordance with generator output (GT output); however, a GT output correction factor K2 is generated by the correction function unit (FX2) 14 based on a relationship corresponding to the compressor inlet temperature, as shown in FIG. 16B, and the GT output value, referring to the table function, is corrected by multiplying the GT output by the correction factor K2 using the multiplier 11. In addition, the limit function unit (FX3) 15 generates a maximum IGV degree of opening M1 based on a relationship corresponding to the compressor inlet temperature, as shown in FIG. 16C, and the limiter 13 limits the IGV degree of opening generated in the table function unit (FX1) 12 so as not to exceed the maximum IGV degree of opening M1.

Known examples of related arts that control the inlet guide vane 104 of the gas turbine 100 in this way include Japanese Unexamined Patent Application, Publication No. 2003-206749 (Patent Citation 1) and Japanese Unexamined Patent Application, Publication No. 2001-200730 (Patent Citation 2). With an operation method disclosed in Patent Citation 1, the intake air flow rate changes greatly depending on the degree-of-opening range such that when the IGV degree-of-opening range is small, a small change in the degree of opening causes a large change in the intake air flow rate and when the IGV degree-of-opening range is large, a small change in the degree of opening causes almost no change in the intake air flow rate; however, a predetermined intake air flow rate for the output can be ensured, even when the intake air flow rate changes greatly depending on the degree-of-opening range as described above. In addition, Patent Citation 2 discloses an operating method in which the maximum IGV degree-of-opening value, which governs the air amount taken into the air compressor using the air compressor inlet temperature as an input, is governed when the actual output of the gas turbine has some allowance with respect to the planned output value or during partial load operation.

Furthermore, degree-of-opening control of a fuel flow rate adjusting vale 105 is carried out based on a control signal 116 from the fuel controller in the controller 110, and load adjustment is carried out by the fuel flow rate control; however, in the fuel controller, based on a blade path temperature setting value for blade path temperature control, an exhaust gas temperature setting value for exhaust gas temperature control, a governor setting value for governor control, or a load limit setting value for load limit control, the lowest value of these is used as a final control signal for the fuel flow rate adjusting valve 105.

In blade path temperature control, the blade path temperature (the exhaust gas temperature immediately after the final stage of the turbine 101) is measured and is compared with a target value based on a temperature adjustment setting, and the blade path temperature setting value is generated by proportional integration (PI) control. In addition, in exhaust gas temperature control, the exhaust gas temperature (the exhaust gas temperature in the exhaust duct downstream of the final stage of the turbine 101) is measured and compared with the target value based on the temperature adjustment setting, and the exhaust gas temperature setting value is generated by proportional integration (PI) control.

FIG. 17 shows a configuration diagram of a portion that generates the temperature adjustment setting, EXREF, used in blade path temperature control and exhaust gas temperature control. The temperature adjustment setting, EXREF, is generated by adding a constant from a signal generator (SG21) 38, using an adder 37, to an output obtained referring to the temperature adjustment setting function unit (FX10) 30 based on a casing pressure, Pcs.

Furthermore, in governor control, velocity control in the rated velocity range is carried out, for which the rotational velocity of the turbine 101 (the generator 150 connected to the turbine 101) is compared with a target value and the governor setting value is generated by proportional (P) control or proportional integration (PI) control. In addition, in load limit control, limit control for the maximum output during load operation is carried out, for which the output of the generator 150 is compared with a target value, and the load limit setting value is generated by proportional integration (PI) control.

FIG. 18 shows a configuration diagram of a portion that carries out load limit control. A target value, LDREF, is generated by signal generators (SG5) 41, (SG6) 49, and (SG8) 52, the adder 42, a subtractor 43, a function unit (FX21) 44, a low value selector 45, and a rate limiter 46; the output of the generator 150 is compared with the target value, LDREF, by the subtractor 47; and the load limit setting value, LDCSO, is generated by proportional integration control with a PI controller 48.

Furthermore, in the configuration shown in FIG. 14, because the generator 150 and the rotational shaft of the turbine 101 are connected, the load of the power generating facility also fluctuates in accordance with the fluctuation of the system frequency. For example, when the system frequency declines, the rotational speed also drops, and the amount of fuel supplied in a gas turbine power generating facility needs to be increased in order to maintain a prescribed rotational speed. Known examples of related arts wherein operating control is carried out in accordance with the frequency fluctuation in this way include Japanese Unexamined Patent Application, Publication No. 2004-27848 (Patent Citation 3) and Japanese Unexamined Patent Application, Publication No. 2003-239763 (Patent Citation 4). Patent Citation 3 discloses a technique of switching to a control that differs from normal control and that mainly aims to recover the system frequency, when an abnormality is detected in the system frequency. In addition, Patent Citation 2 discloses a governor-free control method for performing adjustment so that the rate of change of the system frequency is kept within a limit.

Patent Citation 1: Japanese Unexamined Patent Application, Publication No. 2003-206749.
Patent Citation 2: Japanese Unexamined Patent Application, Publication No. 2001-200730.
Patent Citation 3: Japanese Unexamined Patent Application, Publication No. 2004-27848.
Patent Citation 4: Japanese Unexamined Patent Application, Publication No. 2003-239763.

DISCLOSURE OF INVENTION

Incidentally, in recent years, in the Grid Code (power system operation rule) in the European region, load trackability in response to system frequency fluctuations has come to be required up to 100% load or (100%+α) load, and there is also a similar domestic trend. In response to a load increase in accordance with a control factor in the case where the frequency declines in governor-free operation at a high load, or in response to a load increase command, with conventional technologies, fuel for the gas turbine 100 is increased; however, because temperature adjustment, on the other hand, is operated from the viewpoint of device protection, such as avoiding device damage due to an increase in the combustion temperature (turbine inlet temperature), a desired load may not be obtained.

In other words, in the case of high load, the conventional technologies have coped with a system frequency decline, such as the one shown in FIG. 19 (a), solely through fuel control, without changing the degree of opening of the inlet guide vane 104 of the gas turbine 100 (see FIG. 19 (b)); therefore, in order to satisfy the Grid Code demand response for the shaft output, such as the one shown in FIG. 19 (c), the turbine inlet temperature exceeds an overshoot limit value, as shown in FIG. 19 (e), possibly exceeding even the device protection restriction.

Also, on the other hand, when the overshoot of the turbine inlet temperature is not allowed from the viewpoint of device protection, the Grid Code demand response for the shaft output, shown in FIG. 19(c), may not be satisfied. Specifically, in the case of a single-shaft combined cycle power plant in which the gas turbine 100 and the steam turbine 160 are coaxial, because there is a delay in increasing the output of the steam turbine 160 (ST output), as shown in FIG. 19(d), it is necessary to compensate for the shortfall in output from the steam turbine 160 by the overload operation of the gas turbine 100 in order to satisfy the shaft output prescribed by the Grid Code.

An object of the present invention is to provide a gas turbine operation control device and a gas turbine operation control method that are capable of restricting a turbine inlet temperature to within the overshoot limit range and that are also capable of satisfying the Grid Code demand response for the shaft output.

A first aspect of the present invention is an operation control device for a gas turbine that drives a generator by rotating a turbine with combustion gas generated in a combust or by supplying the combustor with fuel and compressed air from a compressor provided with an inlet guide vane at a front stage, the operation control device for a gas turbine including an IGV control flag generator that activates an IGV emergency fully-open flag when a system frequency drops to or below a predetermined threshold value and an output of the generator is in a high load band at or above a predetermined value, or when the system frequency drops to or below the predetermined threshold value and a degree of opening of the inlet guide vane is in a standard fully-open state; an inlet guide vane degree-of-opening setting portion that, when the IGV emergency fully-open flag is active, sets the degree of opening of the inlet guide vane to a predetermined degree of opening; a temperature controller that sets a temperature adjustment setting by switching in accordance with the degree of opening of the inlet guide vane, and that generates an exhaust gas temperature setting value or a blade path temperature setting value for the turbine based on the temperature adjustment setting; and a fuel controller that controls an amount of fuel to be supplied to the combustor based on the exhaust gas temperature setting value or the blade path temperature setting value.

With this aspect, when the output of the generator is in the high load band at or above the predetermined value, or when the degree of opening of the inlet guide vane is in a standard fully-open state, and the system frequency is lowered to or below a predetermined threshold value, thus activating a frequency low signal, the intake air flow rate of the compressor is increased by forcing the degree of opening of the inlet guide vane into an emergency fully-open state; therefore, it is possible to restrict the turbine inlet temperature to within the overshoot limit range as well as to satisfy the Grid Code demand response for the shaft output due to an increase in the amount of air. In addition, because the temperature adjustment setting can be relaxed by the temperature controller to match the degree of opening of the inlet guide vane, there is no switch back because of the temperature adjustment operation, and thus load responsiveness can be improved.

In the above-described operation control device for a gas turbine, the fuel controller may include a load limit controller that generates a load limit setting value that determines the amount of fuel to be supplied based on the output of the generator, or a governor controller that generates a governor setting value that determines the amount of fuel to be supplied based on a rotational speed of the gas turbine, the amount of fuel supplied to the combustor may be controlled based on the load limit setting value, the governor setting value, the exhaust gas temperature setting value, or the blade path temperature setting value, and an upper limit setting and a rate-of-change setting for the output of the generator in the load limit controller or the governor controller may be set to a predetermined value, when the IGV emergency fully-open flag is active.

Accordingly, the load responsiveness to system frequency fluctuations can be improved.

With the above-described operation control device for a gas turbine, the temperature controller may include a first correction portion that calculates a rate of change of the degree of opening of the inlet guide vane, calculates a correction amount corresponding to the rate of change, and corrects the temperature adjustment setting that is set by switching in accordance with the degree of opening of the inlet guide vane.

Accordingly, by accelerating trackability of the exhaust gas temperature setting value or the blade path temperature setting value, the temperature setting allowance can be transiently accelerated and the load responsiveness to fluctuations in the system frequency can be improved.

In the above-described operation control device for a gas turbine, the temperature controller may include a second correction portion that calculates a rate of change of the degree of opening of the inlet guide vane, calculates a correction amount corresponding to the rate of change, and corrects the exhaust gas temperature setting value or the blade path temperature setting value of the turbine, generated based on the temperature adjustment setting.

Accordingly, the change of the exhaust gas temperature setting value or the blade path temperature setting value is directly advanced, further accelerating trackability thereof, and thereby, the temperature setting allowance can be transiently accelerated and the load responsiveness to the fluctuation of the system frequency can be improved.

In the above-described operation control device for a gas turbine, the first correction portion or the second correction portion may be operated when the degree of opening of the inlet guide vane falls within a predetermined range.

Accordingly, more delicate control becomes possible.

In the above-described operation control device for a gas turbine, the temperature controller may include a PI controller that generates the exhaust gas temperature setting value or the blade path temperature setting value of the turbine by carrying out proportional integration control based on a difference between a target value based on the temperature adjustment setting and a measured exhaust gas temperature or a blade path temperature, and control parameters in the PI controller may be set to predetermined values, when the IGV emergency fully-open flag is active.

Accordingly, the change of the blade path temperature setting value or the exhaust gas temperature setting value can be accelerated, and the load responsiveness to fluctuations in the system frequency can be improved.

In the above-described operation control device for a gas turbine, the IGV control flag generator may activate an IGV standard fully-open-or-greater flag, when temperature adjustment operation is in effect based on the temperature controller, the output of the generator is increasing, and the output of the generator is in the high load band at or above the predetermined value, or when temperature adjustment operation is in effect based on the temperature controller, the output of the generator is increasing, and the degree of opening of the inlet guide vane is in the standard fully-open state; and the inlet guide vane degree-of-opening setting portion may set the degree of opening of the inlet guide vane to the predetermined degree of opening, when the IGV emergency fully-open flag or the IGV standard fully-open-or-greater flag is active.

Accordingly, even when the load is increased without fluctuations in the system frequency, it is possible to cancel the temperature adjustment operation based on the temperature controller, and thus, the load responsiveness (trackability) can be improved. In addition, the shortfall in the steam turbine output can be compensated for by the overload operation of the gas turbine.

In the above-described operation control device for a gas turbine, the IGV control flag generator may deactivate the IGV standard fully-open-or-greater flag with a fixed amount of delay, when an generation condition of the IGV standard fully-open-or-greater flag switches from active to inactive.

Accordingly, it is possible to prevent output loss due to returning from the emergency fully-open state of the inlet guide vane.

In the above-described control device for a gas turbine, the IGV control flag generator may carry out determination of whether the temperature adjustment operation is in effect when the difference between the target value based on the temperature adjustment setting of the temperature controller and the measured exhaust gas temperature or the blade path temperature drops to or below a predetermined value.

Accordingly, by activating the IGV standard fully-open-or-greater flag in advance, the transition to the emergency fully-open state of the inlet guide vane is expedited, and thereby, the load responsiveness (trackability) can be further improved.

In the above-described gas turbine operation control device, the IGV control flag generator may carry out determination of whether the temperature adjustment operation is in effect when a turbine inlet temperature is within a predetermined range.

Accordingly, more delicate control becomes possible.

A second aspect of the present invention is an operation control method for a gas turbine that drives a generator by rotating a turbine with combustion gas generated in a combustor by supplying the combustor with fuel and compressed air from a compressor provided with an inlet guide vane at a front stage, the operation control method for a gas turbine including an IGV control flag generation step of activating an IGV emergency fully-open flag when a system frequency drops to or below a predetermined threshold value, and the generator output is in a high load band at or above a predetermined value, or when the system frequency drops to or below a predetermined value, and the degree of opening of the inlet guide vane is in a standard fully-open state; an inlet guide vane degree-of-opening setting step of setting the degree of opening of the inlet guide vane to a predetermined degree of opening, when the IGV emergency fully-open flag is activated; a temperature control step of generating an exhaust gas temperature setting value or a blade path temperature setting value based on a temperature adjustment setting that is set by switching the temperature adjustment setting in accordance with the degree of opening of the inlet guide vane; and a fuel control step of controlling an amount of fuel to be supplied to the combustor based on the exhaust gas temperature setting value or the blade path temperature setting value.

With the present invention, when the output of the generator is in a high load band at or above a predetermined value, or when the degree of opening of the inlet guide vane is in a standard fully-open state, in which the system frequency declines to or below a predetermined threshold value, thus activating the frequency low signal, the intake air flow rate of the compressor is increased by forcing the degree of opening of the inlet guide vane into the emergency fully-open state; therefore, an advantage is afforded in that it is possible to restrict the turbine inlet temperature to within the overshoot limit range, as well as to satisfy the Grid Code demand response for the shaft output due to an increase in the amount of air; and, additionally, because the temperature adjustment setting can be relaxed by the temperature controller to match the degree of opening of the inlet guide vane, load responsiveness can be improved.

BRIEF DESCRIPTION OF DRAWINGS

FIG. 5B is an explanatory diagram for explaining functions in various function units of the temperature controller.

EXPLANATION OF REFERENCE SIGNS

Figure 1:
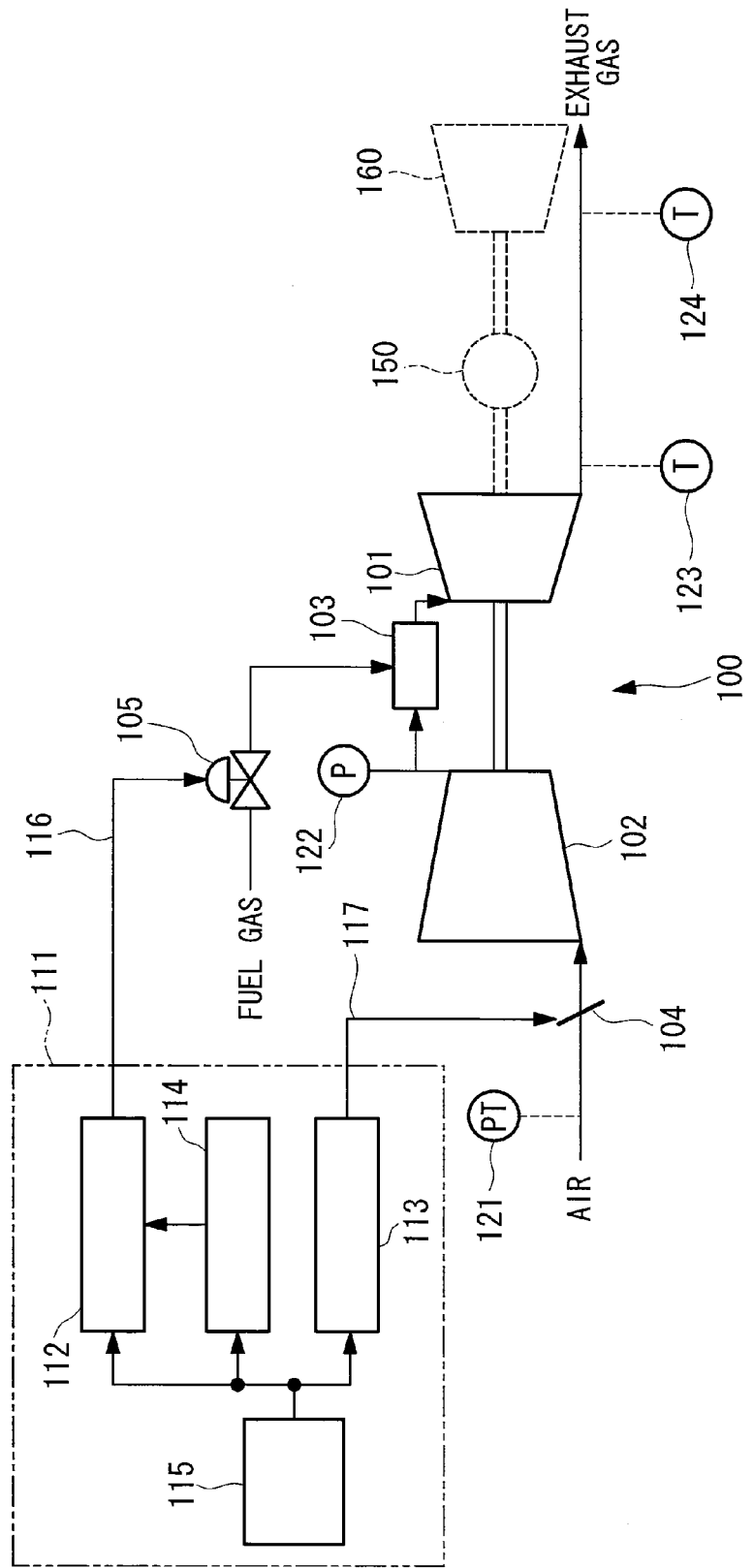
FIG. 1 is a configuration diagram of a gas turbine operation control device according to a first embodiment of the present invention.

100: gas turbine
101: turbine
102: compressor
103: combustor
104: inlet guide vane
105: fuel flow rate adjusting valve
111: controller
112: fuel controller
113: IGV controller
114: temperature controller
115: IGV control flag generator
116: control signal
117: IGV degree-of-opening command
121: intake air state detector
122: casing internal pressure sensor
123: blade path temperature detector
124: exhaust gas temperature detector
150: generator
160: steam turbine
200: advance signal generator (first correction portion)
400: advance signal generator (second correction portion)

BEST MODE FOR CARRYING OUT THE INVENTION

Embodiments of a gas turbine operation control device and an operation control method of the present invention will be described below in detail, referring to the drawings.

First Embodiment

Figure 2:
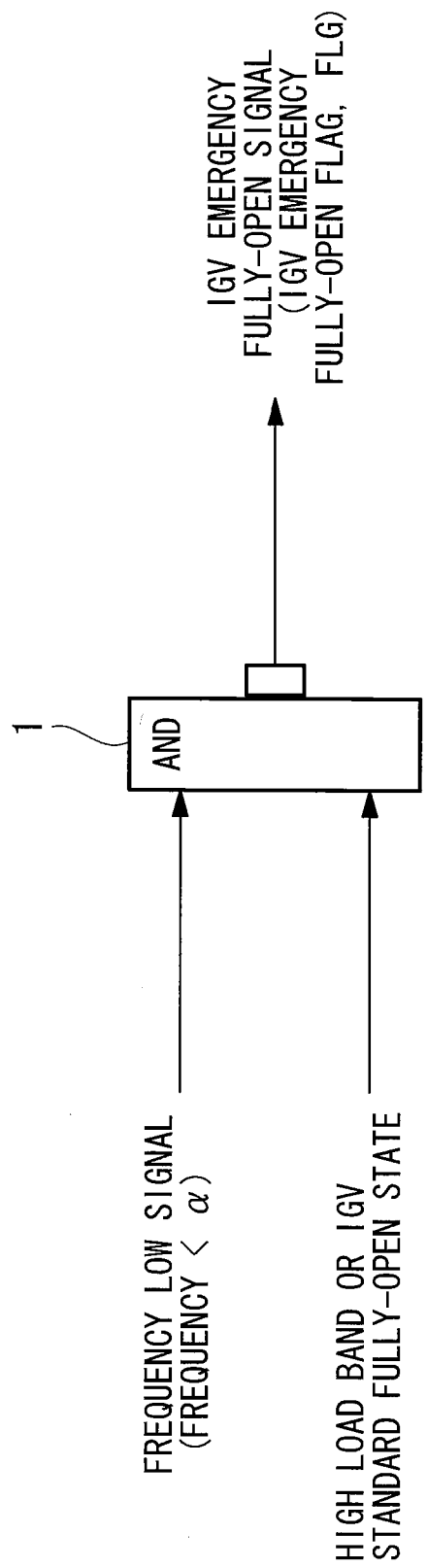
FIG. 2 is a specific configuration diagram of an IGV control flag generator.
Figure 3:
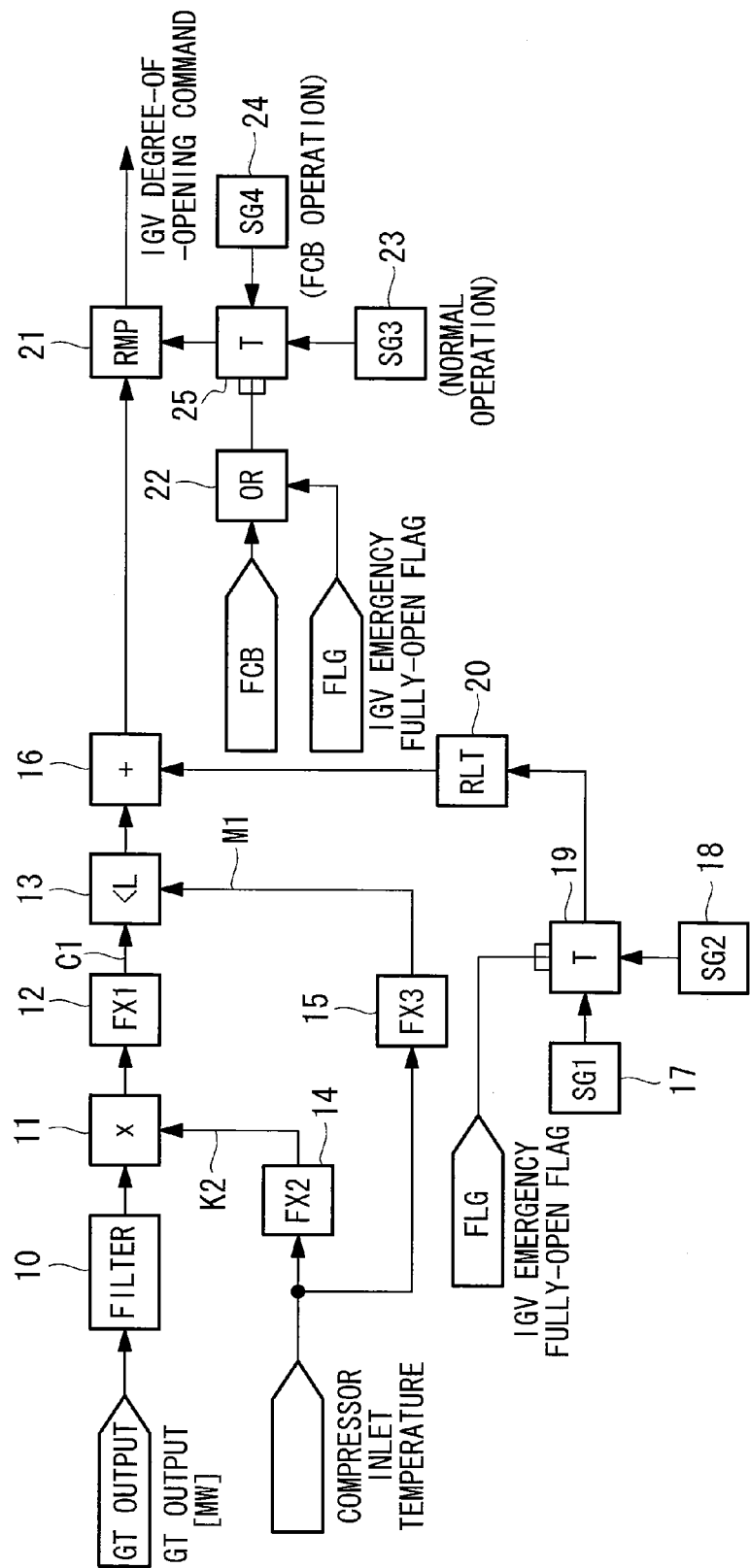
FIG. 3 is a specific configuration diagram of an IGV controller.
Figure 4:
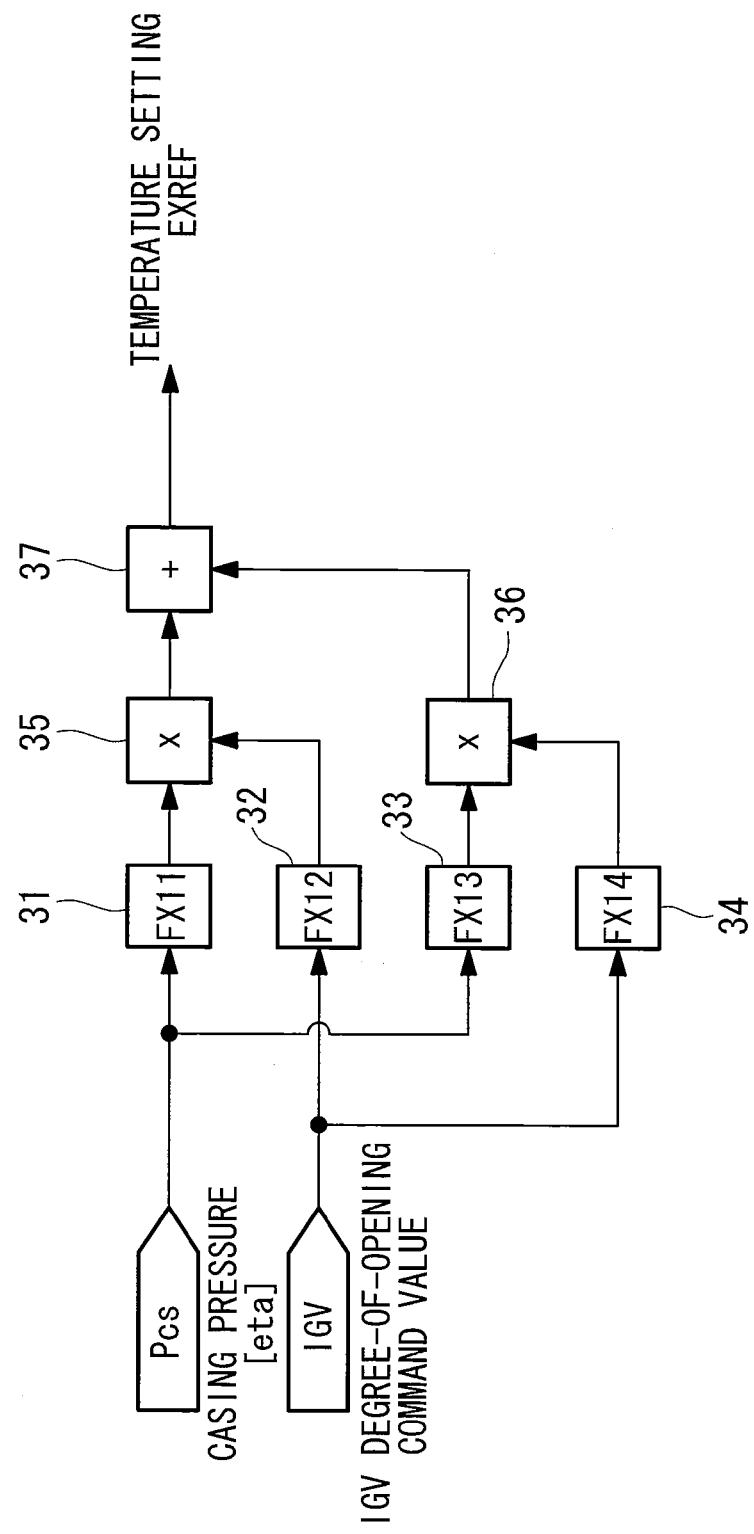
FIG. 4 is a configuration diagram of a portion that generates a temperature adjustment setting in a temperature controller.
Figure 5A:
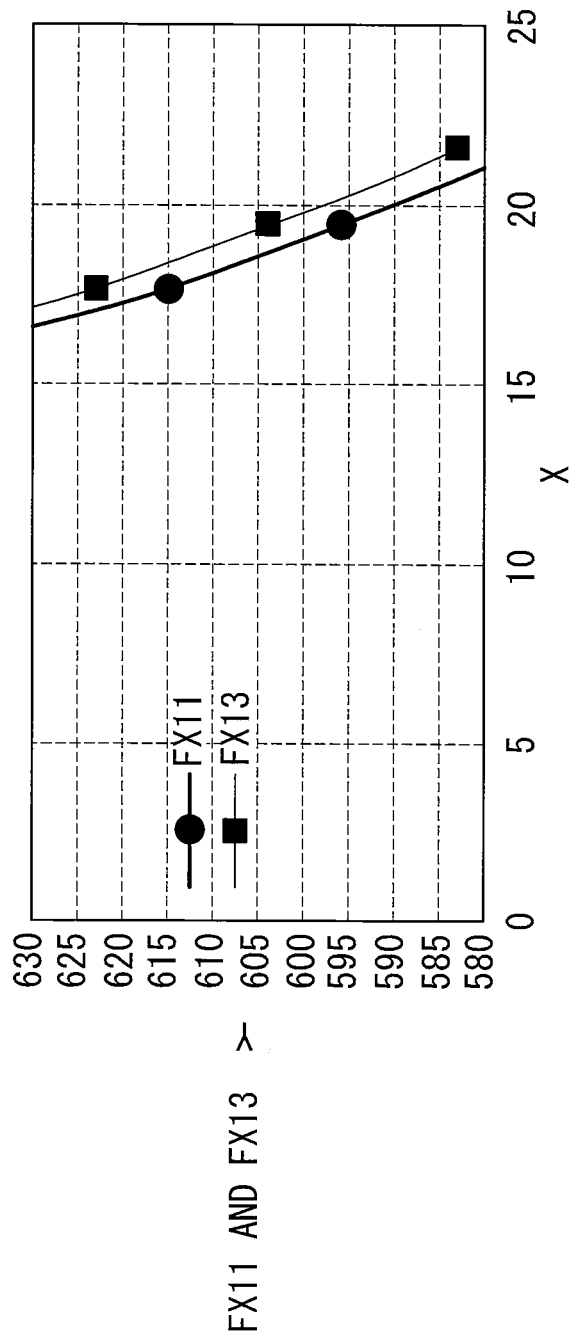
FIG. 5A is an explanatory diagram for explaining functions in various function units of the temperature controller.
Figure 6:
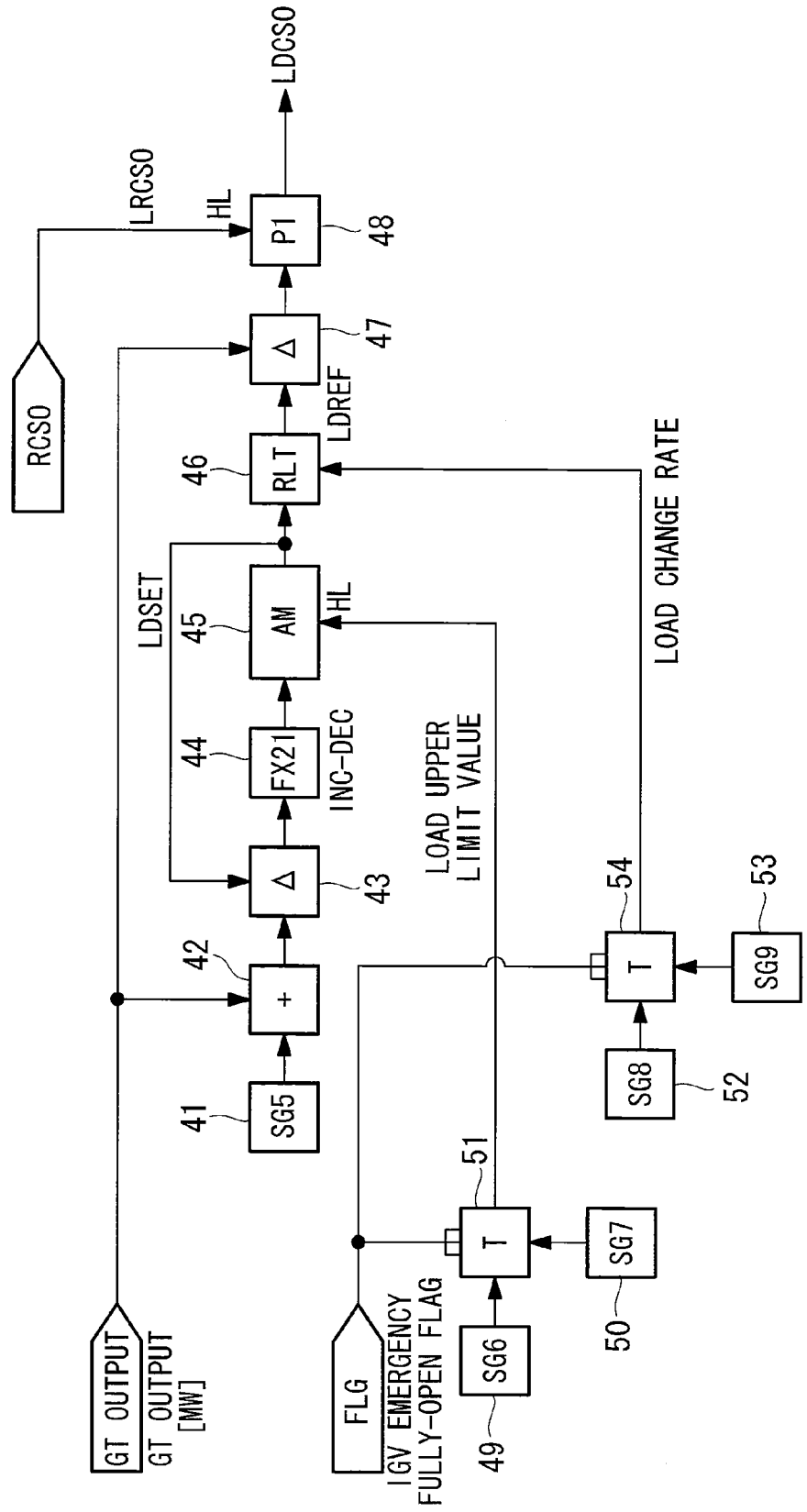
FIG. 6 is a configuration diagram of a portion that performs load limit control in a fuel controller.
Figure 7:
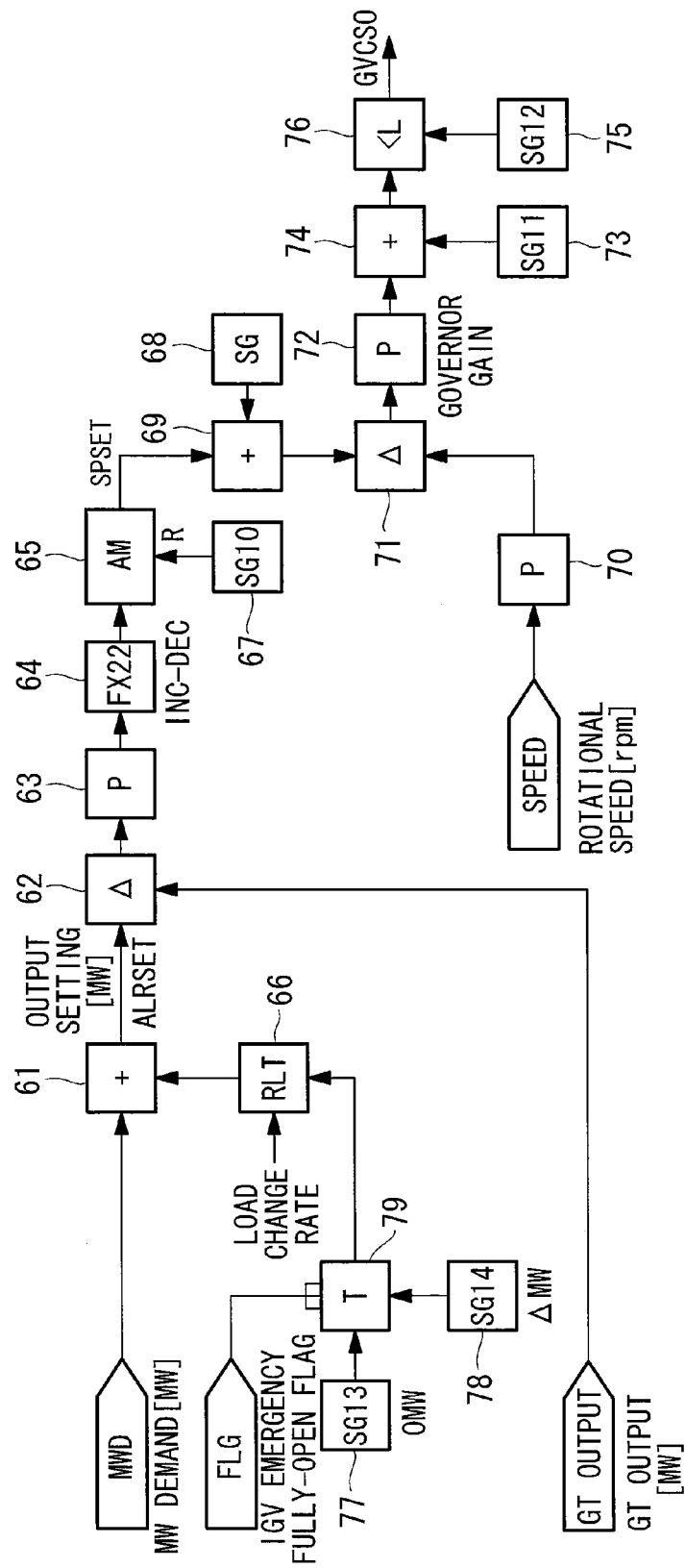
FIG. 7 is a configuration diagram of a portion that performs governor control in the fuel controller.
Figure 14:
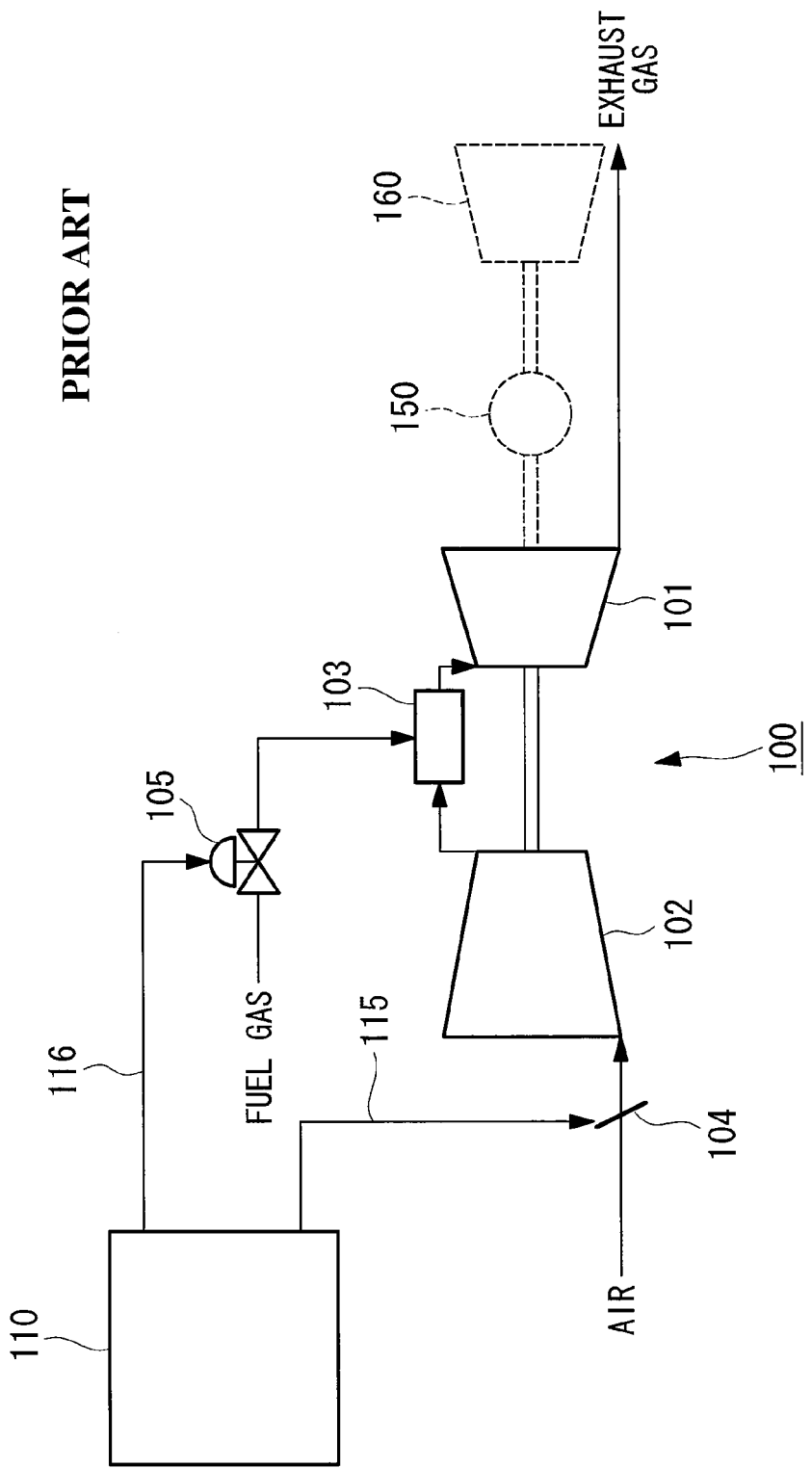
FIG. 14 is a configuration diagram of a conventional gas turbine operation control device.

A gas turbine operation control device and an operation control method according to a first embodiment of the present invention will be described, referring to FIGS. 1 to 7. Here, FIG. 1 is a configuration diagram of the gas turbine operation control device according to the first embodiment of the present invention and, in the diagram, the same reference signs are assigned to portions overlapping with FIG. 14 (conventional example). In addition, FIG. 2 is a specific configuration diagram of an IGV control flag generator in the first embodiment. FIG. 3 is a specific configuration diagram of an IGV controller. FIG. 4 is a configuration diagram of a portion that generates a temperature adjustment setting, EXREF, used in a temperature controller for blade path temperature control and exhaust gas temperature control. FIGS. 5A and 5B are explanatory diagrams for explaining functions in various function units in the temperature controller. FIG. 6 is a configuration diagram of a portion that carries out load limit control in the fuel controller. FIG. 7 is a configuration diagram of a portion that performs governor control in the fuel controller.

In FIG. 1, a gas turbine 100 is provided with a compressor 102, a combustor 103, and a turbine 101. The air compressed in the compressor 102 and the fuel whose flow rate has been adjusted by a fuel flow rate adjusting valve 105 are supplied to the combustor 103 and are mixed and combusted therein, thereby generating high-pressure combustion gas. The high-temperature combustion gas is supplied to the turbine 101 and drives the turbine by expanding. This driving force is transmitted to the compressor and a generator, and thereby power generation and the like are carried out.

The above-described fuel flow rate adjusting valve 105 is operated based on a control signal 116 from a fuel controller 112 of a controller 111. As described above, by controlling the fuel flow rate of the fuel gas, this fuel flow rate adjusting valve 105 adjusts the load and, additionally, the exhaust gas temperature. Note that, in the case of a single-shaft combined cycle power plant, individual rotational shafts of the gas turbine 100, a generator 150, and a steam turbine 160 are integrally connected.

The compressor 102 is provided with an inlet guide vane (IGV) 104 at the front side of first-stage blades. The intake air is given velocity in a circumferential direction by the inlet guide vane 104 and is introduced into the compressor 102. In the compressor 102, the pressure of the introduced air increases, gaining energy as it passes through multiple stages of rotor blades and stator blades. In addition, the inlet guide vane 104 is constituted of a number of movable blades that are provided in the circumferential direction and that are supported so as to be individually movable; actuators of the inlet guide vane 104 are operated based on an IGV degree-of-opening command 117 from an IGV controller 113 of the controller 111, thereby moving these movable blades, and thus, the intake air flow rate and the combustion temperature are adjusted.

The final stage of the turbine 101 is provided with a blade path temperature detector 123 that detects the temperature of the gas that has passed the final stage blades, and additionally, an exhaust gas temperature detector 124 that detects the temperature of the exhaust gas is provided in the exhaust passage at the downstream side of the installation position of the blade path temperature detector 123. Further, an intake air state detector 121 that detects the intake air conditions is provided, and thereby, the intake air temperature and the intake air pressure are detected. The pressure in the casing of the combustor 103 is detected by a casing internal pressure sensor 122. In addition, a generator output sensor (not shown) is provided to detect the load conditions of the turbine 101.

Then, detected signals detected by the blade path temperature detector 123, the exhaust gas temperature detector 124, the intake air state detector 121, the casing internal pressure sensor 122, and the generator output sensor are input to the controller 111. The controller 111 is provided with the fuel controller 112 that carries out supply control of the fuel, a temperature controller 114 that carries out blade path temperature control and exhaust gas temperature control, an IGV controller 113 that carries out degree-of-opening control of the inlet guide vane 104, and an IGV control flag generator 115 that generates an IGV emergency fully-open flag, FLG.

First, the IGV control flag generator 115, as shown in FIG. 2, generates the IGV emergency fully-open flag, FLG, using an AND gate 1, in an active state, when the output of the generator 150 is in the high load band at or above a predetermined value and the system frequency drops to or below a predetermined threshold value α, thereby activating a frequency low signal, or when the degree of opening of the inlet guide vane 104 is in a standard fully-open state. Here, the output of the generator 150 is considered to be in the high load band when it is at or above a predetermined value (for example, 98[%]), and, in addition, the standard fully-open state is defined as a degree-of-opening fully-open state (for example, 0[°] or −4[°]) of the inlet guide vane 104 during normal operation (partial load operation, etc.).

Figure 15:
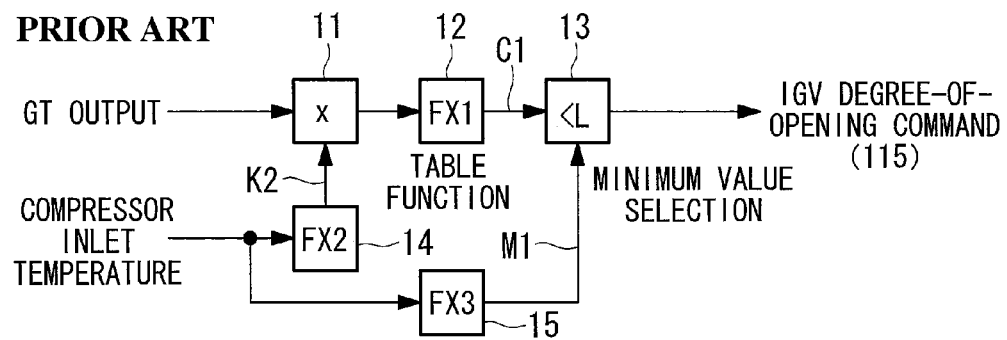
FIG. 15 is a specific partial configuration diagram of an IGV controller of a controller in a conventional example.
Figure 16A:
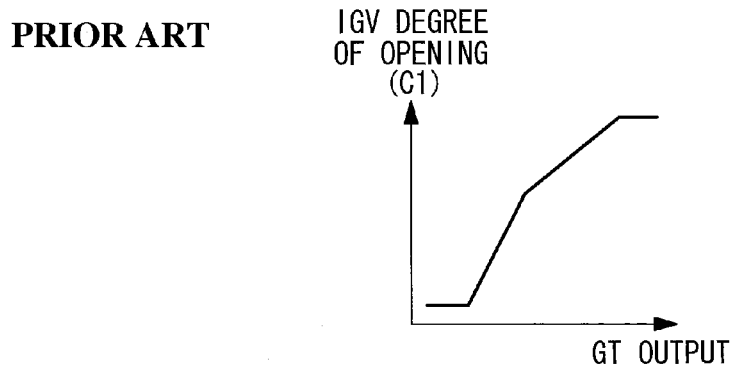
FIG. 16A is an explanatory diagram for explaining functions in various function units in the controller in the conventional example.
Figure 16B:
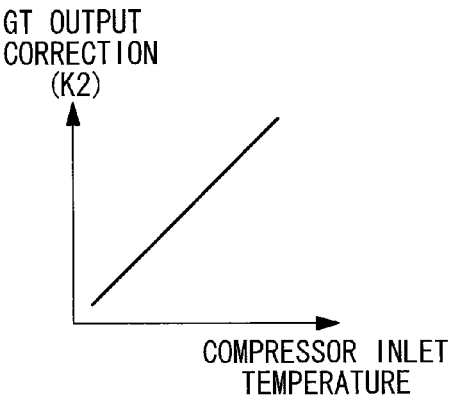
FIG. 16B is an explanatory diagram for explaining functions in various function units in the controller in the conventional example.
Figure 16C:
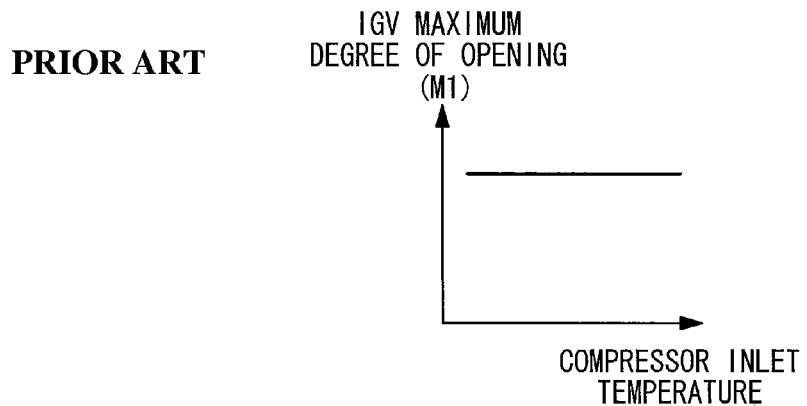
FIG. 16C is an explanatory diagram for explaining functions in various function units in the controller in the conventional example.
Figure 17:
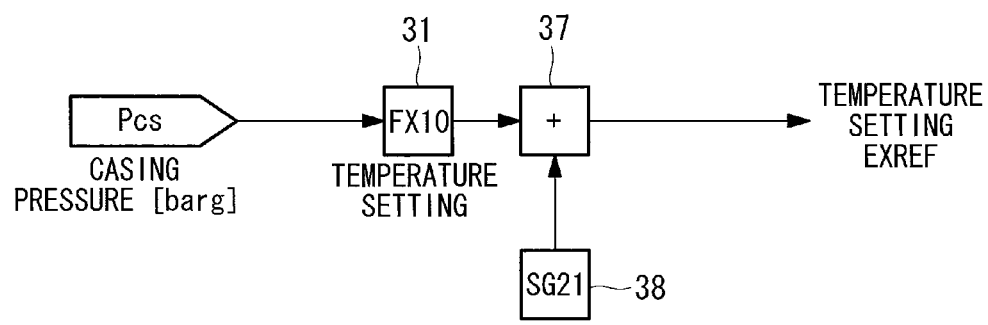
FIG. 17 is a configuration diagram of a portion that generates a temperature adjustment setting in the controller in the conventional example.

Next, the IGV controller 113 is configured as shown in FIG. 3. In FIG. 3, a multiplier 11, a table function unit (FX1) 12, a limiter 13, a correction function unit (FX2), and a limit function unit (FX3) 15 have configurations equivalent to the conventional ones (see FIG. 15). With the IGV controller 113 of this embodiment, a configuration that adds a summation amount based on the IGV emergency fully-open flag, FLG, to the conventional IGV degree-of-opening command and a configuration that limits the rate of change of the IGV degree of opening are additionally included.

With the configuration that adds the summation amount, a signal switcher 19 switches between signal generators (SG1) 17 and (SG2) 18 in accordance with the IGV emergency fully-open flag, FLG, and an adder 16 makes an addition to an IGV degree-of-opening command for the normal operation via a rate limiter 20. For example, "0" is set in the signal generator (SG1) 17 and "−8; emergency fully-open state" is set in the signal generator (SG2) 18; then, when the IGV emergency fully-open flag, FLG, is activated, the value of the signal generator (SG2) 18 is added to the IGV degree-of-opening command for the normal operation, thus forcibly entering the emergency fully-open state.

Additionally, the configuration that limits the rate of change of the IGV degree of opening is a configuration wherein a signal switcher 25 switches between signal generators (SG3) 23 and (SG4) 24 in accordance with a signal obtained by taking the logical sum of a first cut back flag and the IGV emergency fully-open flag, FLG, with an OR gate 22, and supplies this to a rate-of-change limiter 21 to change the rate-of-change limit value of the IGV degree of opening. Here, a rate-of-change limit value for the normal state (for example, 400[%/m]) is set in the signal generator (SG3) 23, and a rate-of-change limit value for the first cut back state (for example, 3000[%/m]) is set in the signal generator (SG4) 24. In other words, when the IGV emergency fully-open flag, FLG, is activated, the rate-of-change limit value for the first cut back state is applied. The above-described rate limiter 20 may be eliminated by adding the function thereof to the rate-of-change limiter 21.

Next, in the temperature controller 114, the blade path temperature controller compares a measured value of the blade path temperature (the exhaust gas temperature immediately after the final stage of the turbine 101) from the blade path temperature detector 123 and the target value based on the temperature adjustment setting, and generates a blade path temperature setting value by proportional integration (PI) control. In addition, the exhaust gas temperature controller compares the measured value of the exhaust gas temperature (the exhaust gas temperature in the exhaust duct downstream of the final stage of the turbine 101) from the exhaust gas temperature detector 124 and the target value based on the temperature adjustment setting value, and generates an exhaust gas temperature setting value by proportional integration (PI) control.

In the temperature controller 114 of this embodiment, as shown in FIG. 4, the settings of the temperature adjustment setting, EXREF, for blade path temperature control and exhaust gas temperature control are switched in accordance with the degree-of-opening command value, IGV, of the inlet guide vane 104.

For example, the configuration of the portion that generates the temperature adjustment setting, EXREF, is a configuration provided with function units (FX11) 31, (FX12) 32, (FX13) 33, and (FX14) 34, multipliers 35 and 36, and an adder 37. As shown in FIG. 5A, a casing pressure/temperature adjustment setting function for the normal operation and a casing pressure/temperature adjustment setting function for the emergency fully-open state of the inlet guide vane 104 are set in the function units (FX11) 31 and (FX13) 33, respectively. In addition, as shown in FIG. 5B, the capability of a bivariate function wherein a 0 signal and a 1 signal are mutually reversed is set in the function units (FX12) 32 and (FX14) 34. In other words, during the normal operation where the degree-of-opening command value, IGV, of the inlet guide vane 104 is, for example, 0[°] or greater, the temperature adjustment setting, EXREF, is generated based on the function unit (FX11) 31, and during the emergency fully-open state where the degree-of-opening command value, IGV, of the inlet guide vane 104 is, for example, less than −8[°], the temperature adjustment setting, EXREF, is generated based on the function unit (FX13) 33.

As shown in FIG. 5A, as compared with a function in the function unit (FX11) 31 selected during the normal operation, a function in the function unit (FX13) 33 that is selected in the emergency fully-open state has a higher temperature adjustment setting for the same casing pressure. In a situation where the degree of opening of the inlet guide vane 104 is at the emergency fully-open state, the casing pressure increases, and continuing to use the function unit (FX11) 31 that is selected during the normal operation ends up decreasing the temperature adjustment setting; therefore, a higher temperature adjustment setting that matches the degree of opening of the inlet guide vane 104 is set by switching to the function unit (FX13) 33.

Next, the fuel controller 112 carries out degree-of-opening control of the fuel flow rate adjusting valve 105 based on the control signal 116 and carries out load adjustment by fuel flow rate control, whereas in the fuel controller 112, based on the blade path temperature setting value in the blade path temperature controller, the exhaust gas temperature setting value in the exhaust gas temperature controller, the load limit setting value in the load limit controller, or the governor setting value in the governor controller, the lowest value among these is used as the final control signal for the fuel flow rate adjusting valve 105.

Maximum output limit control during a load operation is performed in the load limit controller, and the load limit setting value is generated by proportional integration (PI) control, comparing the output of the generator 150 and a target value. The load limit controller is configured as shown in FIG. 6.

Figure 18:
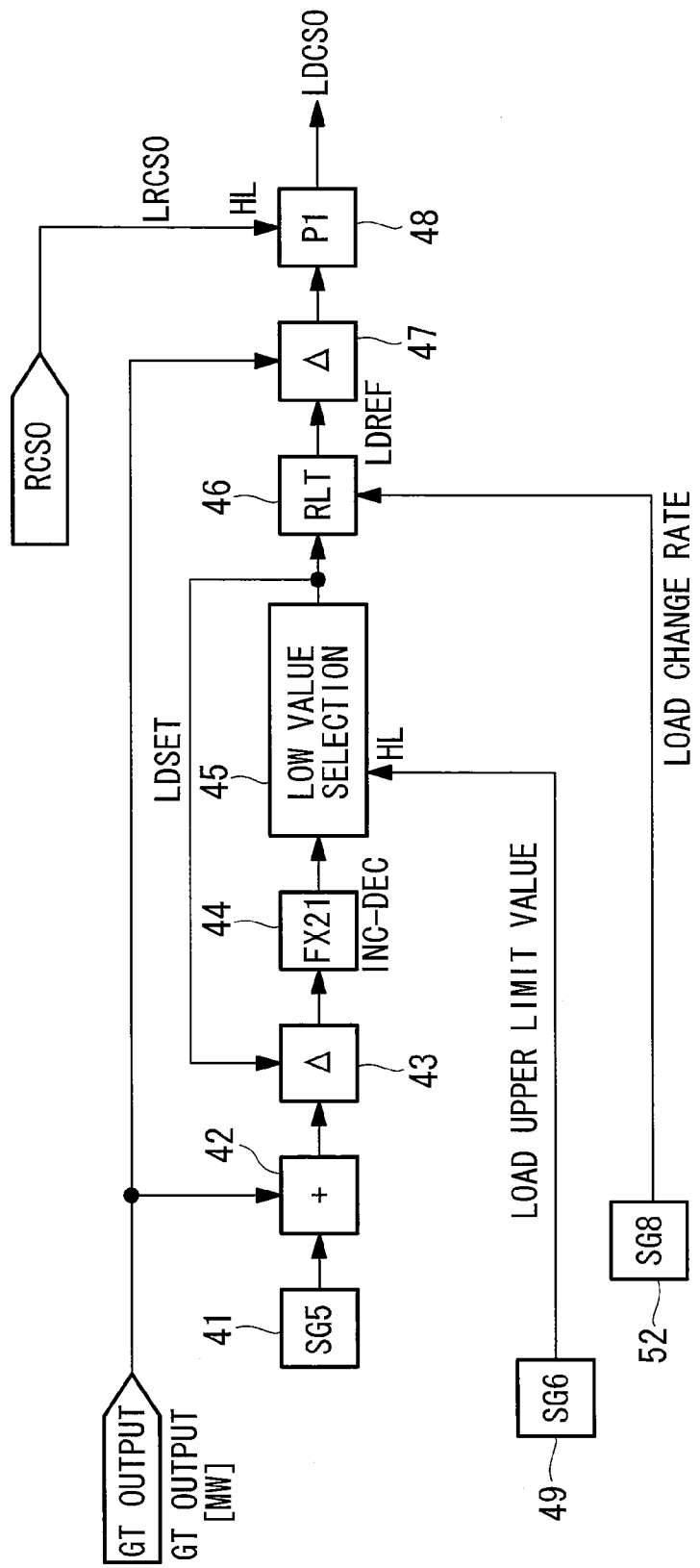
FIG. 18 is a configuration diagram of a portion that performs load limit control in the controller in the conventional example.

In FIG. 6, as in a conventional case (see FIG. 18), the basic portion that generates a target value, LDREF, includes signal generators (SG5) 41, (SG6) 49, and (SG8) 52, an adder 42, a subtractor 43, a function unit (FX21) 44, an analog memory 45, and a rate limiter 46; compares the output of the generator 150 and the target value, LDREF, using a subtractor 47; and generates the load limit setting value, LDCSO, by proportional integration control with a PI controller 48. However, a difference from the conventional case is that a load upper limit value in the low value selector 45 and a load change rate in the rate limiter 46 are switched between in accordance with the IGV emergency fully-open flag, FLG. The analog memory 45 is an element that adds/subtracts a value corresponding to an increment/decrement of the function unit (FX21) to/from its own value.

For example, the load upper limit value is generated by switching between the signal generators (SG6) 49 and (SG7) 59 with a signal switcher 51 in accordance with the IGV emergency fully-open flag, FLG. Here, a load upper limit value for a normal state (for example a GT output [MW] corresponding to 100[%]) is set in the signal generator (SG6) 49, and a load upper limit value for an emergency fully-open state (for example, a GT output [MW] corresponding to 105 [%]) is set in the signal generator (SG7) 50. In other words, when the IGV emergency fully-open flag, FLG is activated (at the time of frequency fluctuation), a GT output [MW] corresponding to 105[%] is set as the load upper limit value.

In addition, the load change rate is generated by switching between the signal generators (SG8) 52 and (SG9) 53 with the signal selector 51 in accordance with the IGV emergency fully-open flag, FLG. Here, a load change rate for the normal state is set in the signal generator (SG8) 52, and a load change rate for the emergency fully-open state (for example, about 100 times the normal state) is set in the signal generator (SG9) 53. In other words, when the IGV emergency fully-open flag, FLG is activated (at the time of frequency fluctuation), a load change rate corresponding to approximately 100 times that in the normal state is applied.

In addition, in the governor controller, velocity control in a rated velocity range is carried out, and a governor setting value, GVCSO, is generated by proportional (P) control, comparing the rotational speed of the turbine 101 (the generator 150 connected to the turbine 101) and a target value. The governor is configured as shown in FIG. 7.

In FIG. 7, the governor controller has a configuration that includes signal generators (SG13) 77, (SG14) 78, (SG10) 67, (SG) 68, (SG11) 73, and (SG12) 75, a signal switcher 79, a rate limiter 66, adders 61, 69, and 74, subtractors 62 and 71, proportional controllers 63, 70, and 72, a function unit (FX22) 64, an analog memory 65, and a low value selector 76.

This configuration is a conventional configuration (not shown), with the addition of the signal generators (SG13) 77 and (SG14) 78, the signal selector 79, the rate limiter 66 and the adder 61, wherein a load increment for the normal state (for example, GT output (0 [MW] corresponding to 0[%]) is set in the signal generator (SG13) 77 and a load change increment for the emergency fully-open state (for example GT output [MW] corresponding to 5[%]) is set in the signal generator (SG14) 78, and an output setting, ALRSET, [MW] corresponding to a maximum of 105[%] is set when the IGV emergency fully-open flag, FLG, is activated (at the time of frequency fluctuation). Note that the function unit (FX22) 64 prevents an increase (i.e. output is always 0) when a parameter other than the governor setting value, GVCSO, is selected in the fuel controller 112.

Figure 19:
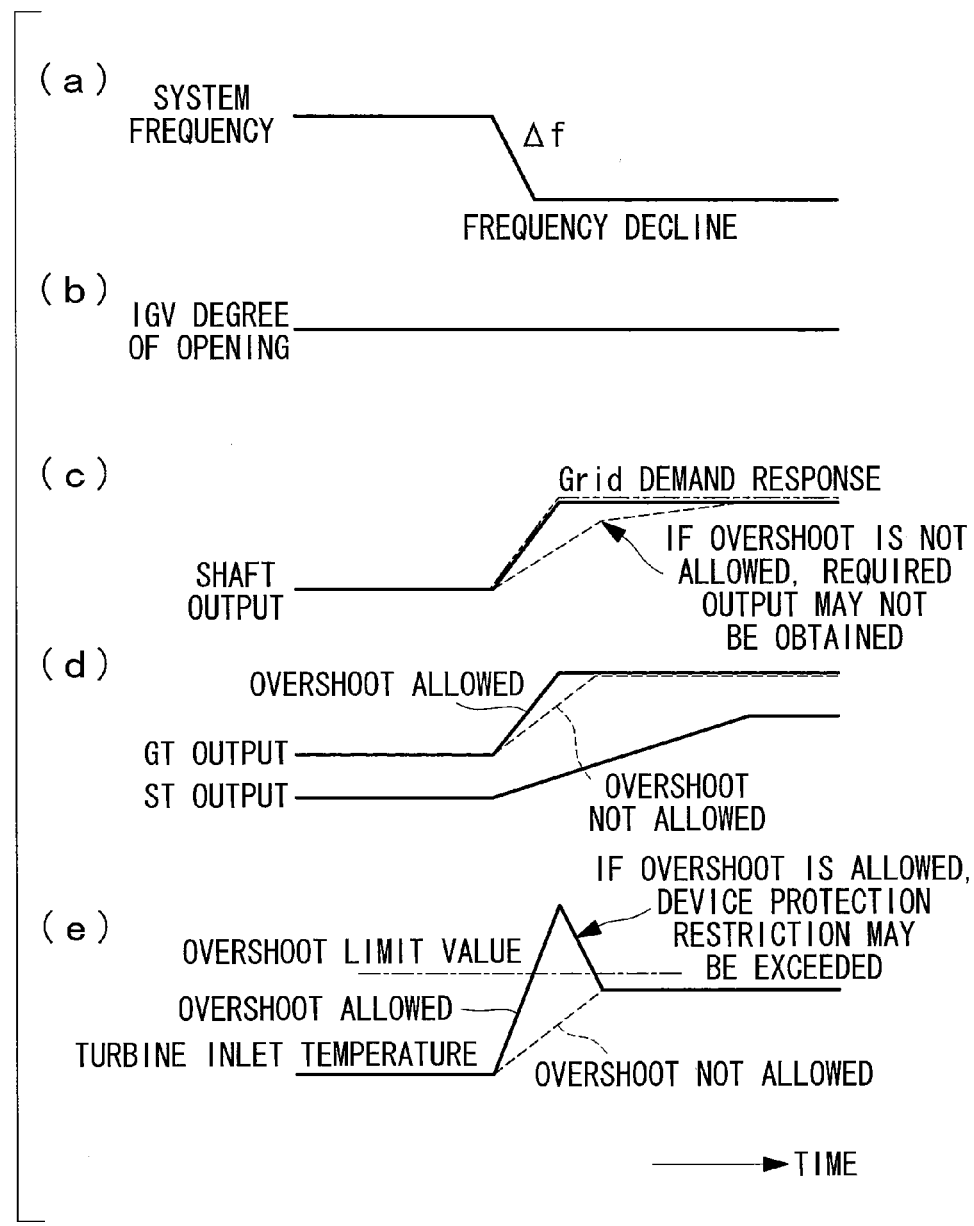
FIG. 19 is time charts of various parameters when the system frequency in the conventional example decreases.

Next, operation control by the gas turbine operation control device of this embodiment will be described. Here, a description will be given taking as an example the case in which the system frequency has declined by Δ f (see FIG. 19 (a)).

The IGV emergency fully-open flag, FLG, is generated by the IGV control flag generator 115, in an active state, when the output of the generator 150 is in the high load band at or above a predetermined value, or when the degree of opening of the inlet guide vane 104 is in a standard fully-open state, making the system frequency drop by Δ f to or below a predetermined threshold value α, thus activating the frequency low signal.

Upon receiving this, in the IGV controller 113, the IGV degree-of-opening command 117 is forcibly set to a value for the emergency fully-open state, changing the degree of opening of the inlet guide vane 104 to the emergency fully-open state. In addition, in the temperature controller 114, when the IGV degree-of-opening command 117 is set to a value for the emergency fully-open state, the temperature adjustment setting is relaxed to a higher temperature adjustment setting, EXREF, that matches the degree of opening of the inlet guide vane 104, and furthermore, the upper limit setting and rateof-change setting for the output of the generator 150 in load limit control and governor control are relaxed to the upper limit setting and rate-of-change setting set in advance when the IGV emergency fully-open flag, FLG, is active.

Generally, the turbine inlet temperature is proportional to the fuel-air ratio (ratio of the fuel amount to the amount of combustion air), and thus, changing the IGV degree of opening in a direction that opens the inlet guide vane 104 increases the intake air flow rate of the compressor 102, increasing the amount of combustion air; therefore, the fuel air ratio, in other words, the turbine inlet temperature, decreases. On the other hand, there is also a relationship, "turbine output=turbine throughflow rate_turbine heat drop_efficiency", and thus, changing the IGV degree of opening in the direction that opens the inlet guide vane 104 increases the intake air flow rate of the compressor 102, also increasing the turbine throughflow rate; therefore, the output of the generator 150 increases if the increase in the turbine throughflow rate makes a contribution equal to or greater than the heat drop due to the decrease in the turbine inlet temperature.

Therefore, it is possible to contain the turbine inlet temperature within an overshoot limit range and also to satisfy the Grid Code demand response for the shaft output. In addition, especially in the case of the single-shaft combined cycle power plant, in which the gas turbine 100 and the steam turbine 160 are coaxial, because of a delay in an increase in the output of the steam turbine 160 (ST output), the shortfall in the output of the steam turbine 160 needs to be compensated for by overload operation of the gas turbine 100 in order to satisfy the shaft output prescribed by the Grid Code; however, high load responsiveness in this embodiment allows for adequately coping with such a situation.

Note that, with respect to the frequency fluctuation during governor-free operation, a method with which the IGV degree-of-opening command 117 is corrected by calculating the IGV degree of opening in accordance with the amount of frequency fluctuation may be considered; however, depending on the amount of frequency fluctuation, the IGV degree of opening may remain between the degree of opening for the standard fully-open state and the degree of opening for the emergency fully-open state, and thus, there is a risk that operation control may become unstable due to conflict between the IGV controller 113 and the fuel controller 112. In this embodiment, stable operation control is possible even in such a case because the IGV degree of opening is forced into the emergency fully-open state, and thus, desired output can be stably supplied for an extended period of time.

As described above, in the gas turbine operation control device and operation control method of this embodiment, when the output of the generator 150 is in the high load band at or above a predetermined value, or when the degree of opening of the inlet guide vane 104 is in a standard fully-open state, and the system frequency drops by Δ f to or below a predetermined threshold value, thus activating the frequency low signal, the degree of opening of the inlet guide vane 104 is forced into the emergency fully-open state, increasing the intake air flow rate of the compressor 102; therefore, it is possible to contain the turbine inlet temperature within the overshoot limit range and to satisfy the Grid Code demand response for the shaft output, due to an increase in the air flow rate. In addition, in the temperature controller 114, because the temperature adjustment setting is relaxed to a higher temperature adjustment setting, EXREF, that matches the degree of opening of the inlet guide vane 104, the load responsiveness can be improved.

In addition, in the gas turbine operation control device and the operation control method of this embodiment, when the IGV emergency fully-open flag is active, the upper limit setting and the rate-of-change setting for the output of the generator 150 in the load limit controller or the governor controller are set to values that are set in advance, and therefore, the load responsiveness to fluctuations in the system frequency can be improved.

Second Embodiment

Next, a gas turbine operation control device and operation control method according to a second embodiment of the present invention will be described, referring to FIGS. 8 and 9. Here, FIG. 8 is a configuration diagram of a portion that generates a temperature adjustment setting, EXREF, in a temperature controller 114 of the second embodiment of the present invention, and FIGS. 9A through 9C are explanatory diagrams that explain switching of the temperature adjustment setting, EXREF.

Note that the feature of this embodiment, as compared with the configuration of the temperature controller 114 of the first embodiment, is the addition of an advance signal generator (first correction portion) 200 that calculates a rate of change of the degree of opening of the inlet guide vane 104, thereby calculating a correction amount in accordance with the rate of change, and that corrects the settings of the temperature adjustment setting, EXREF, by switching in accordance with the degree of opening of the inlet guide vane 104; the overall configuration of the gas turbine operation control device, the configuration of the IGV controller 113, and the configuration of the fuel controller 1112 are equivalent to those of the first embodiment (FIGS. 1, 2, 6, and 7), and descriptions of individual components will be omitted. In addition, as for the configuration of the portion of the temperature controller 114 that generates the temperature adjustment setting, EXREF, components equivalent to those of the first embodiment (FIG. 3) are given identical reference signs in FIG. 8, and descriptions thereof will be omitted.

Figure 8:
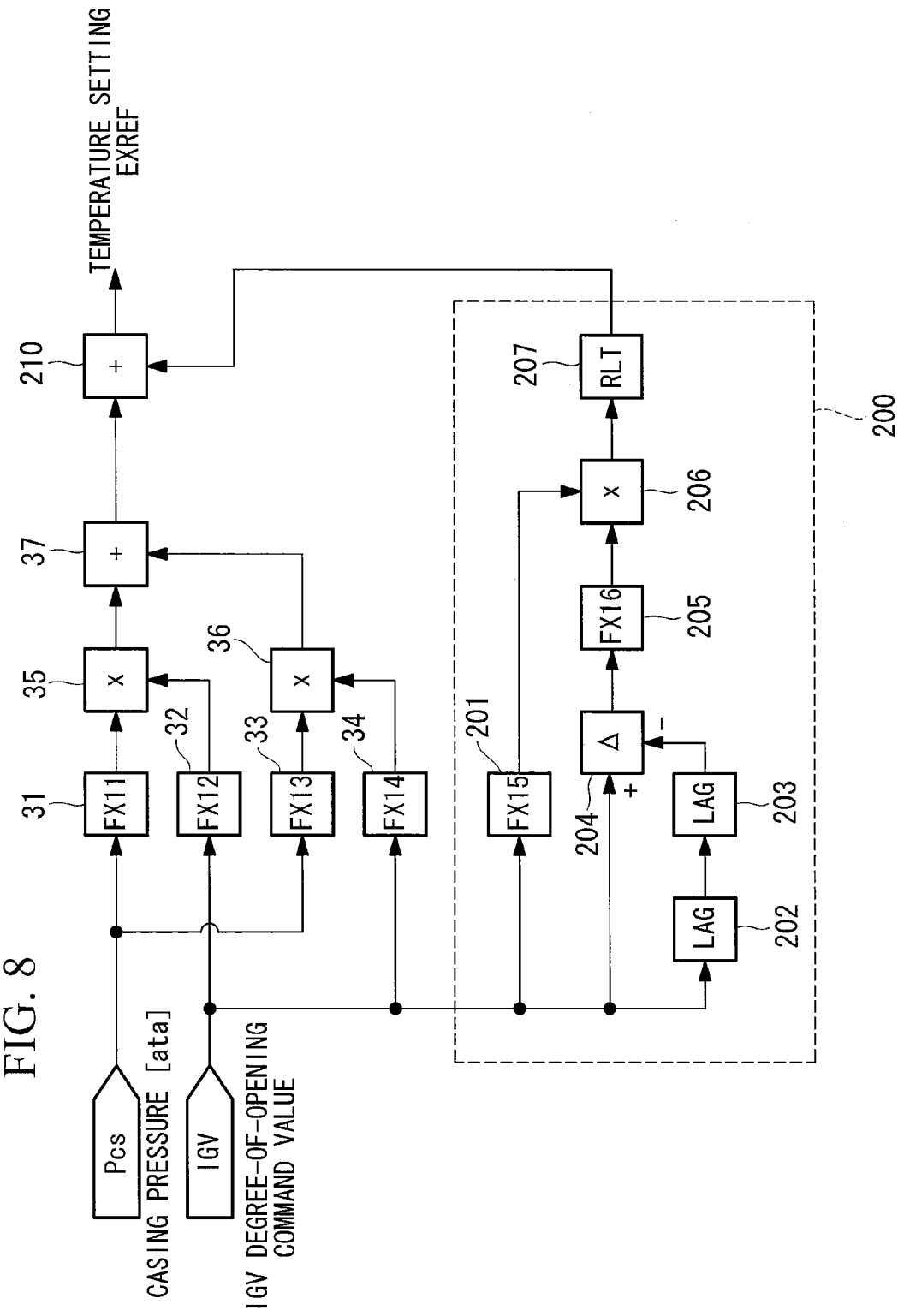
FIG. 8 is a configuration diagram of a portion that generates a temperature adjustment setting in a temperature controller according to a second embodiment of the present invention.

In FIG. 8, the portion of the temperature controller 114 that generates the temperature adjustment setting, EXREF, is configured including function units (FX11) 31, (FX12) 32, (FX13) 33, and (FX14) 34, multipliers 35 and 36, adders 37 and 210, and the advance signal generator 200. In addition, the advance signal generator 200 is configured having primary delay filters 202 and 203, a subtractor 204, a function unit (FX16) 205, a function unit (FX15) 201, a multiplier 206, and a rate limiter 207. Regarding the primary delay filters 202 and 203, one (for example, 202 only) or three may be provided.

In the advance signal generator 200, first, a difference between a signal wherein the IGV degree-of-opening command value is delayed by the primary delay filters 202 and 203 and a signal without a delay is determined by the subtractor 204, and this difference is obtained as a rate of change (quasi-derivative) of the IGV degree-of-opening command value. Then, a correction amount (advance signal) for the temperature adjustment setting, EXREF, is set in the function unit (FX16) 205 in accordance with the magnitude of this rate of change (quasi-derivative) of the IGV degree-of-opening command value.

In addition, the function unit (FX15) 201 defines the operating range of the advance signal generator 200 so as to be operable only when the degree of opening of the inlet guide vane 104 falls within a predetermined range; for example, by using a function that defines the IGV degree of opening ranging from the vicinity of the standard fully-open degree of opening to the vicinity of the emergency fully-open degree of opening as "1" and that defines the rest as "0" as the function FX15 and by multiplying this with the multiplier 206, correction (advance signal) by the advance signal generator 200 can be activated only within the range where the switching of the temperature adjustment settings, EXREF, is carried out.

Further, the rate limiter 207 restricts the possible correction amount for the temperature adjustment setting, EXREF, in other words, the rate of change per unit time for the advance signal, and the temperature adjustment setting, EXREF, is generated by adding the correction amount, via the rate limiter 207, with the adder 210.

Figure 9A:
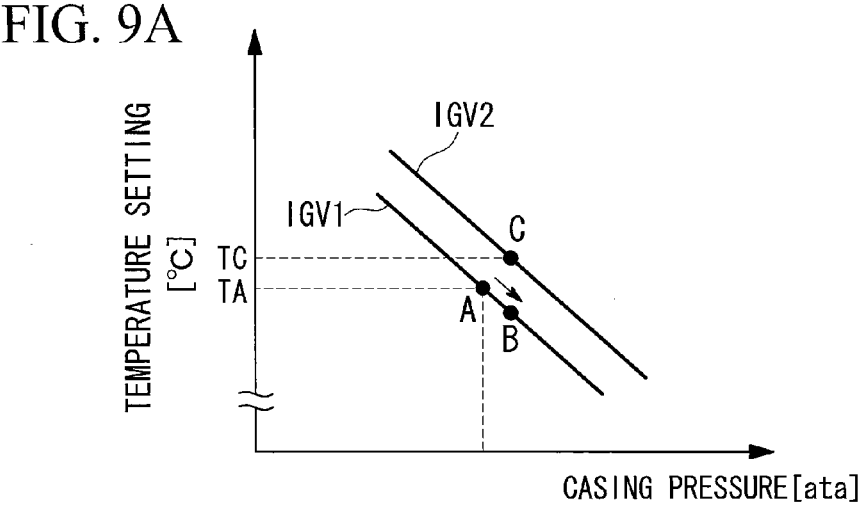
FIG. 9A is an explanatory diagram for explaining switching of the temperature adjustment settings.

As shown in FIG. 9A, in a situation where the degree of opening of the inlet guide vane 104 is in the emergency fully-open state, the casing pressure increases, and continued use of the function IGV1 in the function unit (FX11) 31 ends up decreasing the temperature adjustment setting (from A to B); therefore, a function IGV2 in the function unit (FX13) 33 is switched to so as to shift to a higher temperature adjustment setting (from A to C) matching the degree of opening of the inlet guide vane 104.

Figure 9B:
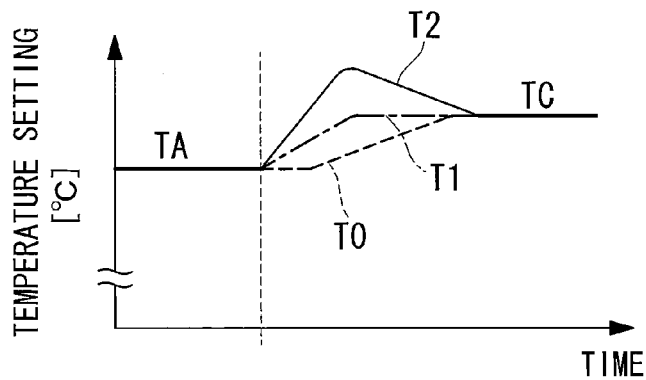
FIG. 9B is an explanatory diagram for explaining switching of the temperature adjustment settings.
Figure 9C:
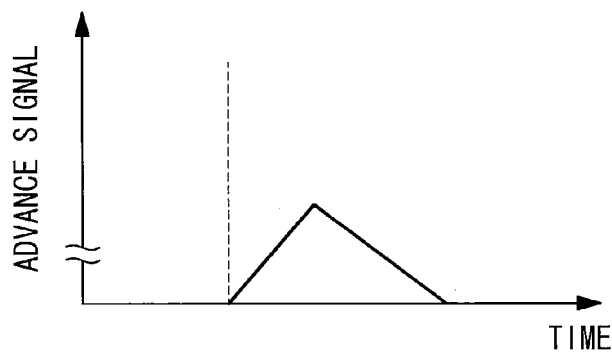
FIG. 9C is an explanatory diagram for explaining switching of the temperature adjustment settings.

The change over time of the temperature adjustment setting, EXREF, at this time is as shown by T1 in FIG. 9B, but the actual blade path temperature or exhaust gas temperature changes slowly, as shown by T0 in FIG. 9B, due to a delay in temperature measurement. Thus, in this embodiment, by adding the correction amount (advance signal) from the advance signal generator 200 as shown in FIG. 9C, the change over time of the temperature adjustment setting, EXREF, is shifted as shown by T2 in FIG. 9B, thereby further accelerating the trackability of the actual blade path temperature or exhaust gas temperature.

In this way, in this embodiment, the rate of change of the degree of opening of the inlet guide vane 104 is calculated to calculate the correction amount in accordance with the rate of change, by the advance signal generator (first correction portion) 200, and the temperature adjustment setting, EXREF, set by switching in accordance with the degree of opening of the inlet guide vane 104, is corrected; therefore, by accelerating the trackability of the blade path temperature setting value and the exhaust gas temperature setting value, the temperature setting allowance can be transiently accelerated, and the load responsiveness to fluctuations in the system frequency can be improved.

Third Embodiment

Figure 10:
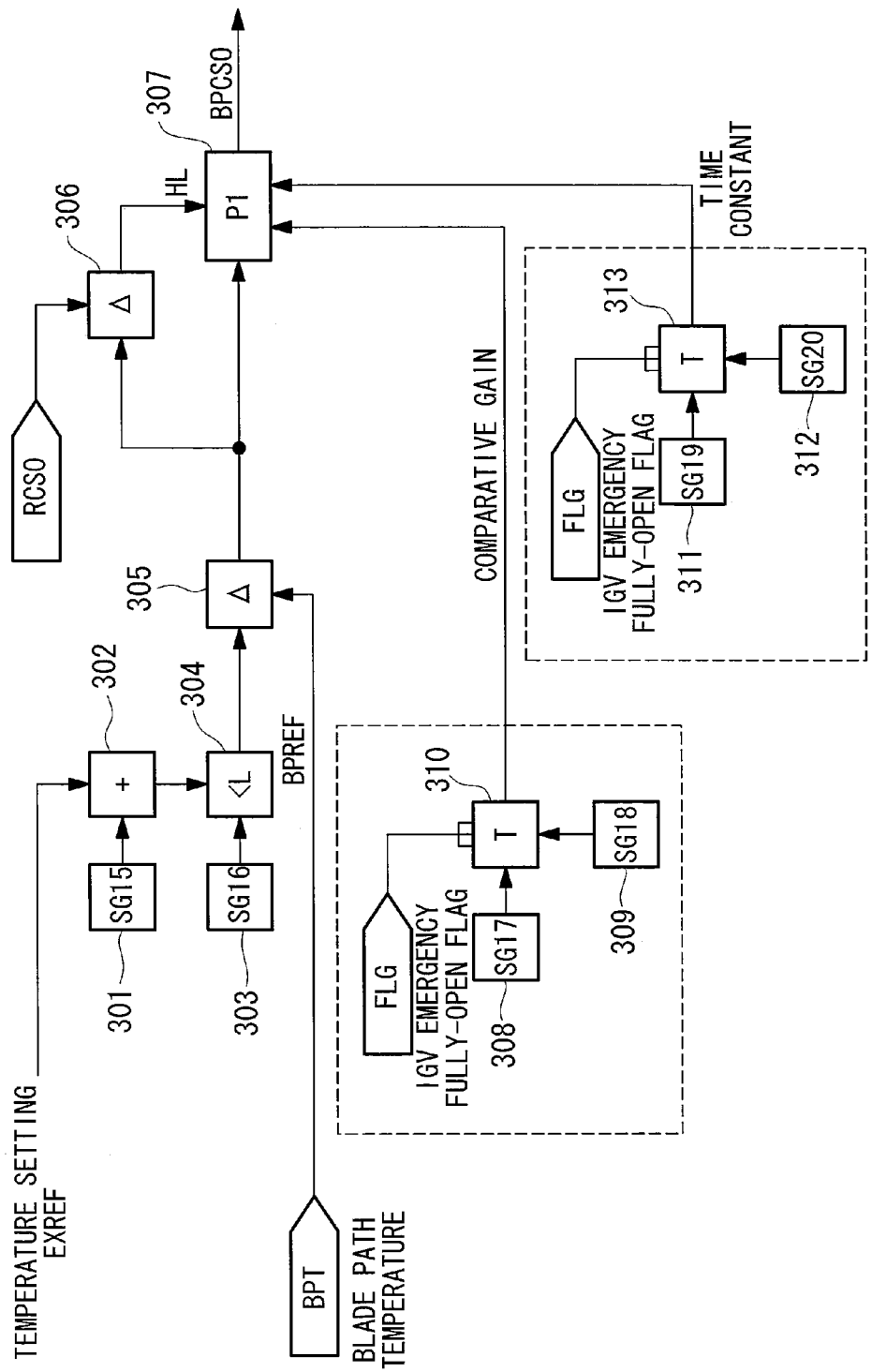
FIG. 10 is a configuration diagram of a blade path temperature controller in a temperature controller according to a third embodiment of the present invention.

Next, a gas turbine operation control device according to a third embodiment of the present invention will be described referring to FIG. 10. Here, FIG. 10 is a configuration diagram of the blade path temperature controller of the temperature controller 114 of the third embodiment of the present invention, and the portion that generates the temperature adjustment setting, EXREF, is omitted, assuming that the configuration of the first embodiment or the second embodiment will be used therefor. In addition, the overall configuration of the gas turbine operation control device, the configuration of the IGV controller 113, and the configuration of the fuel controller 112 are equivalent to those in the first embodiment (FIGS. 1, 2, and 7), and descriptions of individual components thereof will be omitted.

In FIG. 10, the blade path temperature controller in the temperature controller 114 of this embodiment is configured having signal generators (SG15) 301, (SG16) 303, (SG17) 308, (SG18) 309, (SG19) 311, and (SG20) 312, signal switchers 310 and 313, an adder 302, subtractors 305 and 306, a low value selector 304, and a PI controller 307.

A value that is the lower value between a predetermined value SG16 and a value obtained by adding a predetermined value SG15 to the temperature adjustment setting, EXREF, with the adder 302 is selected by the low value selector 304, and this value is set as the target value, BPREF; the difference between the target value, BPREF, and a measured value of the blade path temperature, BPT, from the blade path temperature detector 123, is determined by the subtractor 305; and a blade path temperature setting value, BPCSO, is generated by carrying out proportional integration control based on the difference, with the PI controller 307.

An upper limit value in the PI controller 307 is taken as the difference between the difference from the subtractor 305 and a expected value, RCSO. Furthermore, the feature of the blade path temperature controller of this embodiment is that, when the IGV emergency fully-open flag, FLG, is active, a control parameter of the PI controller 307 is set to a value that is set in advance, and here, a proportional gain and time constant are set by switching in accordance with the IGV emergency fully-open flag, FLG.

In other words, the proportional gain is generated by switching between the signal selectors (SG17) 308 and (SG18) 309 with the signal switcher 310, in accordance with the IGV emergency fully-open flag, FLG. Here, a proportional gain for the normal state is set in the signal generator (SG17) 308, and a proportional gain for the emergency fully-open state is set in the signal generator (SG18) 309. In addition, the time constant is generated by switching between the signal generators (SG19) 311 an (SG20) 312 with the signal switcher 313, in accordance with the IGV emergency fully-open flag, FLG. Here, a time constant for the normal state is set in the signal generator (SG19) 311, and a time constant for the emergency fully-open state is set in the signal generator (SG20) 312. Note that, in terms of stability, it is preferable to use smaller values for the proportional gain and time constant; however, shifting the IGV degree of opening to the emergency fully-open state involves urgency, and thus, placing greater importance on the trackability, it is preferable to make the proportional gain and the time constant larger than those for the normal state.

Accordingly, in the blade path temperature controller of the temperature controller 114 of this embodiment (similarly for the exhaust gas controller), proportional integration control by the PI controller 307 is carried out based on the difference between the measured blade path temperature, BPT, and the target value, BPREF, based on the temperature adjustment setting, EXREF, to generate the blade path temperature setting, BPCSO, for the turbine; and because control parameters (proportional gain and time constant) in the PI controller 307 are set to values that are set in advance, when the IGV emergency fully-open flag, FLG, is active, the change of the blade path temperature setting value, BPCSO, can be accelerated, and the load responsiveness to fluctuations in the system frequency can be improved.

Fourth Embodiment

Figure 11:
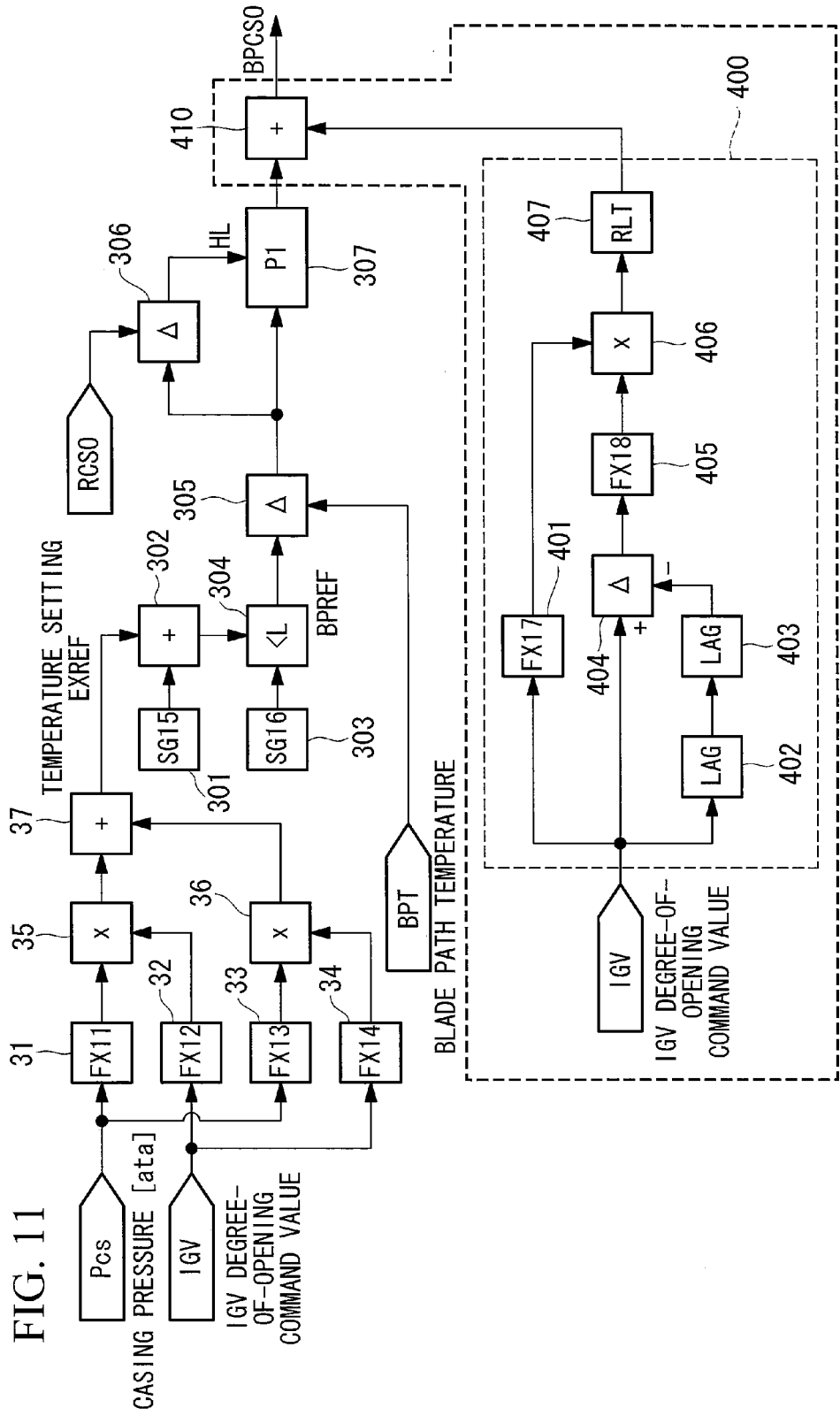
FIG. 11 is a configuration diagram of a blade path temperature controller in a temperature controller according to a fourth embodiment of the present invention.

Next, a gas turbine operation control device according to a fourth embodiment of the present invention will be described, referring to FIG. 11. Here, FIG. 11 is a configuration diagram of a blade path temperature controller of the temperature controller 114 of the fourth embodiment of the present invention. In addition, the overall configuration of the gas turbine operation control device, the configuration of the IGV controller 113, and the configuration of the fuel controller 112 are equivalent to those of the first embodiment (FIGS. 1, 2, 6, and 7), and descriptions of the individual components will be omitted.

In FIG. 11, the blade path temperature controller of the temperature controller 114 of this embodiment is configured having a configuration of the portion of the first embodiment (see FIG. 4) that generates the temperature adjustment setting, EXREF, signal generators (SG15) 301 and (SG16) 303, adders 302 and 410, subtractors 305 and 306, a low value selector 304, a PC controller 307, and an advance signal generator 400.

A value that is a lower value between a predetermined value SG16 and the value obtained by adding a predetermined value SG15 to the temperature adjustment setting, EXREF, with the adder 302 is selected by the low value selector 304, and this value is set as a target value, BPREF; the subtractor 305 determines the difference between the target value, BPREF, and the measured value of the blade path temperature, BPT, from the blade path temperature detector 123; and the PI controller 307 carries out proportional integration control based on the difference, generating the blade path temperature setting value, BPCSO. Note that the upper limit value of the PI controller 307 is taken as the difference between the difference from the subtractor 305 and an expected value, RCSO.

The feature of the blade path temperature controller of the temperature controller 114 of this embodiment is the addition of the advance signal generator (second correction portion) 400 that calculates a rate of change of the degree of opening of the inlet guide vane 104, thereby calculating a correction amount in accordance with the rate of change, and that corrects the blade path temperature setting value, BPCSO, generated based on the temperature adjustment setting, EXREF. The advance signal generator 400 is configured having primary delay filters 402 and 403, a subtractor 404, a function unit (FX18) 405, a function unit (FX17) 401, a multiplier 406, and a rate limiter 407. As for the primary delay filters, one or three may be provided.

In the advance signal generator 400, first, a difference between a signal wherein an IGV degree-of-opening command value is delayed by the primary delay filters 402 and 403 and a signal without a delay is determined by the subtractor 404, and this difference is obtained as a rate of change (quasi-derivative) of the IGV degree-of-opening command value. Then, a correction amount (advance signal) for the blade path temperature setting value, BPSCO, is set in the function unit (FX18) 405 in accordance with the magnitude of this rate of change (quasi-derivative) of the IGV degree-of-opening command value.

In addition, the function unit (FX17) 401 defines the operating range of the advance signal generator 400 so as to be operable only when the degree of opening of the inlet guide vane 104 falls within a predetermined range; for example, by using a bivariate function that defines the IGV degree of opening ranging from the vicinity of the standard fully-open degree of opening to the vicinity of the emergency fully-open degree of opening as "1" and that defines the rest as "0" as the function FX17 and multiplying this with the multiplier 306, correction (advance signal) by the advance signal generator 400 can be activated only within the range where the switching of the temperature adjustment setting, EXREF, is carried out.

Further, the rate limiter 407 restricts the correction amount for the blade path temperature setting value, BPCSO, in other words, the rate of change per unit time for the advance signal, and the blade path temperature setting value, BPCSO, is generated by adding the correction amount, via the rate limiter 407, with the adder 410.

In this way, in this embodiment, the advance signal generator 400 calculates a rate of change of the degree of opening of the inlet guide vane 104, thereby calculating a correction amount in accordance with the rate of change, and corrects the blade path temperature setting value, BPCSO, by directly adding the correction amount (advance signal) thereto; therefore, the change of the blade path temperature setting value, BPCSO can be directly advanced, thereby further accelerating the trackability, and thus, the temperature setting allowance can be transiently accelerated, and the load responsiveness to fluctuations in the system frequency can be improved.

Fifth Embodiment

Figure 12A:
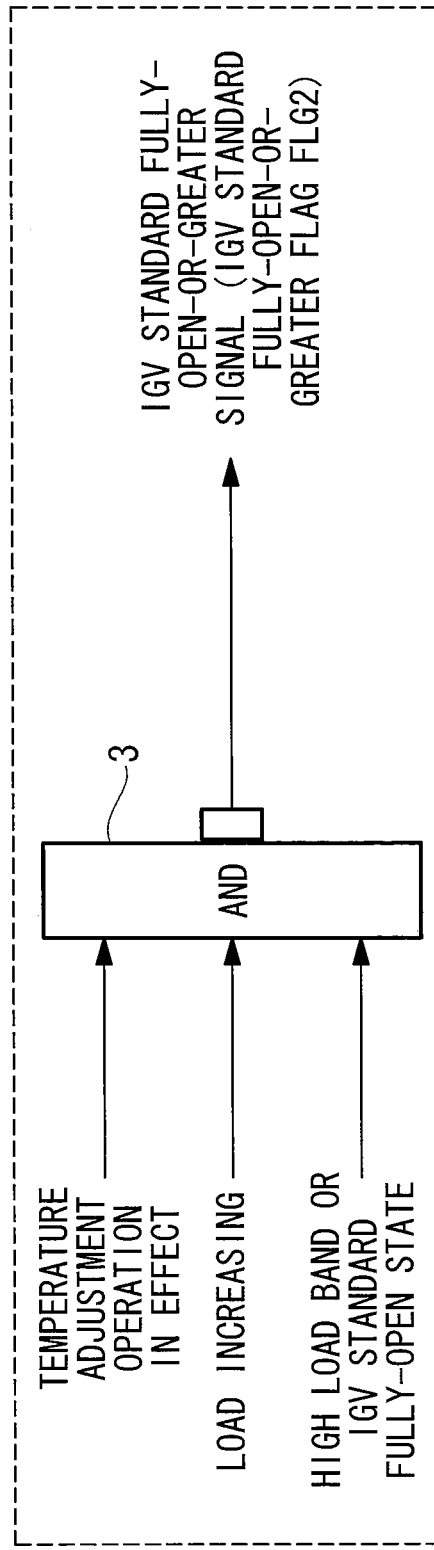
FIG. 12A is a specific configuration diagram of an IGV control flag generator according to a fifth embodiment of the present invention.
Figure 12B:
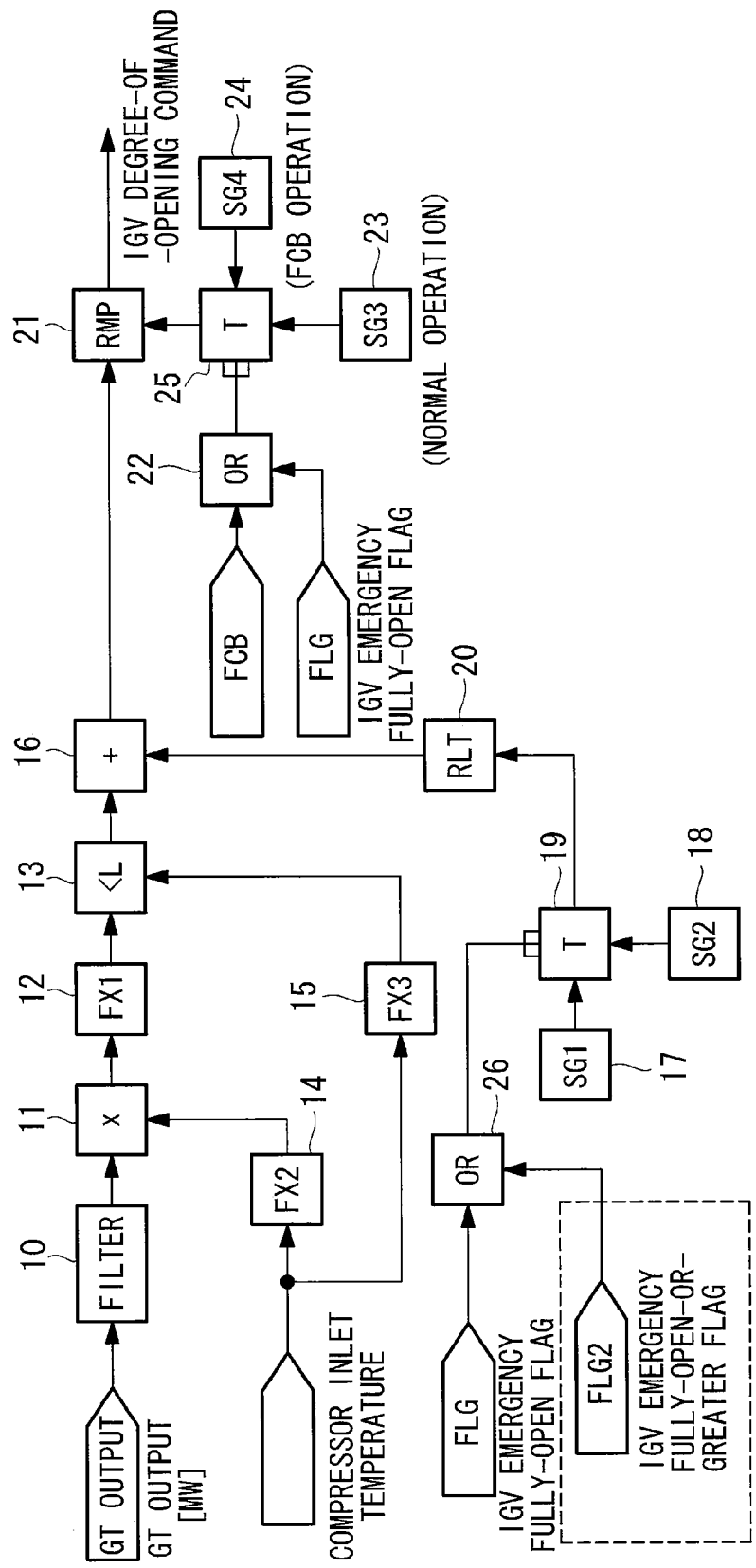
FIG. 12B is a specific configuration diagram of an IGV controller according to the fifth embodiment of the present invention.

Next, a gas turbine operation control device according to a fifth embodiment of the present invention will be described, referring to FIGS. 12A and 12B. Here, FIG. 12A is a specific configuration diagram of an IGV control flag generator 115 of the fifth embodiment, and FIG. 12B is a specific configuration diagram of an IGV controller 113. In addition, the overall configuration of the gas turbine operation control device, the configuration of the temperature controller 114, and the configuration of the fuel controller 112 are equivalent to those of the first to fourth embodiments (FIGS. 1, 2, 6, 7, etc.), and descriptions of the individual components will be omitted.

In the IGV control flag generator 115, as in the first embodiment (see FIG. 2), the IGV emergency fully-open flag, FLG, is generated by the AND gate 1, and, as shown in FIG. 12B, an IGV standard fully-open-or-greater flag, FLG2, is generated by an AND gate 3.

In other words, the IGV standard fully-open-or-greater flag, FLG2, is generated by the AND gate 3, in an active state, when the temperature adjustment based on the temperature controller 114 is in effect, the output of the generator 150 is increasing, and the output of the generator 150 is in the high load band at or above a predetermined value; or when the temperature adjustment based on the temperature controller 114 is in effect, the output of the generator 150 is increasing, and the degree of opening of the inlet guide vane 104 is in the standard fully-open state.

Here, regarding the determination of whether the temperature adjustment operation is in effect or not, it is determined that the temperature adjustment operation is in effect when the blade path temperature setting value, BPCSO, or the exhaust gas temperature setting value is being used in the fuel controller 112 as a final control signal for the fuel flow rate adjusting valve 105.

In addition, for the determination of whether the output of the generator 150 is increasing or not, a load increasing flag is used, that, for example, is active, when a difference, which is a difference taken between a signal for output setting [MW] delayed by the primary delay filter and a signal without delay, is positive and equal to or greater than a predetermined value Additionally, when the output of the generator 150 is at or above a predetermined value (for example, 98[%]), operation is considered to be in the high load band, and furthermore, the fully-open state (for example, 0[°] or −4[°]) of the inlet guide vane 104 during the normal operation (partial load operation, etc.) is defined as the standard fully-open state.

Next, the IGV controller 113 is configured as shown in FIG. 12B. That is, it is a configuration in which an OR gate 26 is added to the configuration of the first embodiment (see FIG. 3). In other words, a configuration for adding the summation amount based on the IGV emergency fully-open flag, FLG, or the IGV standard fully-open-or-greater flag, FLG2, to the conventional IGV degree-of-opening command and a configuration for limiting the rate of change of the IGV degree of opening based on the IGV emergency fully-open flag, FLG, are additionally included.

In the configuration for adding the summation amount, the signal generator (SG1) 17 and (SG2) 18 are switched between with the signal switcher 19 in accordance with the IGV emergency fully-open flag, FLG, or the IGV standard fully-open-or-greater flag, FLG2, and the signal therefrom is added to the conventional IGV degree-of-opening command, i.e. the IGV degree-of-opening command in the normal operation, by the adder 16 via the rate limiter 20. For example, "0" is set in the signal generator (SG1) 17 and "−8; emergency fully-open state" is set in the signal generator (SG2) 18, and when the IGV emergency fully-open flag, FLG, or the IGV standard fully-open-or-greater flag, FLG2, is activated, the value from the signal generator (SG2) 18 is added to the IGV degree-of-opening command in the normal operation to forcibly establish the emergency fully-open state.

In the above-described gas turbine operation control devices of the first to fourth embodiments, the IGV emergency fully-open flag, FLG, is activated when the output of the generator 150 is in the high load band at or above a predetermined value, or when the degree of opening of the inlet guide vane 104 is in a standard fully-open state, and the system frequency is at or below a predetermined value α, thus activating the frequency low signal; when the IGV emergency fully-open flag, FLG, is active, the degree of opening of the inlet guide vane 104 is forced into the emergency fully-open state, thereby increasing the intake air flow rate of the compressor 102, and thus the turbine inlet temperature is contained within the overshoot limit range, and the Grid Code demand response for the shaft output is satisfied due to the increase in the air flow rate.

Even when the system frequency is not fluctuating, there are situations with a poor load responsiveness (trackability) in a GTCC operating in the high load band, because of the delay in the output of the steam turbine 160 (ST output) when the load is increasing, and because of the upper limit of the output of the generator 150 due to the temperature adjustment operation. In this embodiment, it is determined whether the system is in such a situation by using the IGV standard fully-open-or-greater flag, FLG2, and the degree of opening of the inlet guide vane 104 is forced into the emergency fully-open state when the IGV standard fully-open-or-greater flag, FLG2, is active, thus affording an equivalent advantage.

For example, with the gas turbine operation control device of this embodiment, when, in the IGV control flag generator 115, the temperature adjustment operation based on the temperature controller 114 is in effect, the output of the generator 150 is increasing, and the output of the generator 150 is in the high load band at or above a predetermined value, or when the degree of opening of the inlet guide vane 104 is in the standard fully-open state, the IGV fully-open-or-greater flag, FLG2, is activated; and when the IGV emergency fully-open flag, FLG, or the IGV standard fully-open-or-greater flag, FLG2, is active in the IGV control flag generator 115, the degree of opening of the inlet guide vane 104 is set to a degree of opening that is set in advance (the degree of opening of the emergency fully-open state). Accordingly, even at the time of load increase without fluctuations in the system frequency, it is possible to cancel the temperature adjustment operation based on the temperature controller 114 and to improve the load responsiveness (trackability). In addition, it is possible to compensate for the output shortfall of the steam turbine 160 with the overload operation of the gas turbine 100.

Sixth Embodiment

Figure 13:
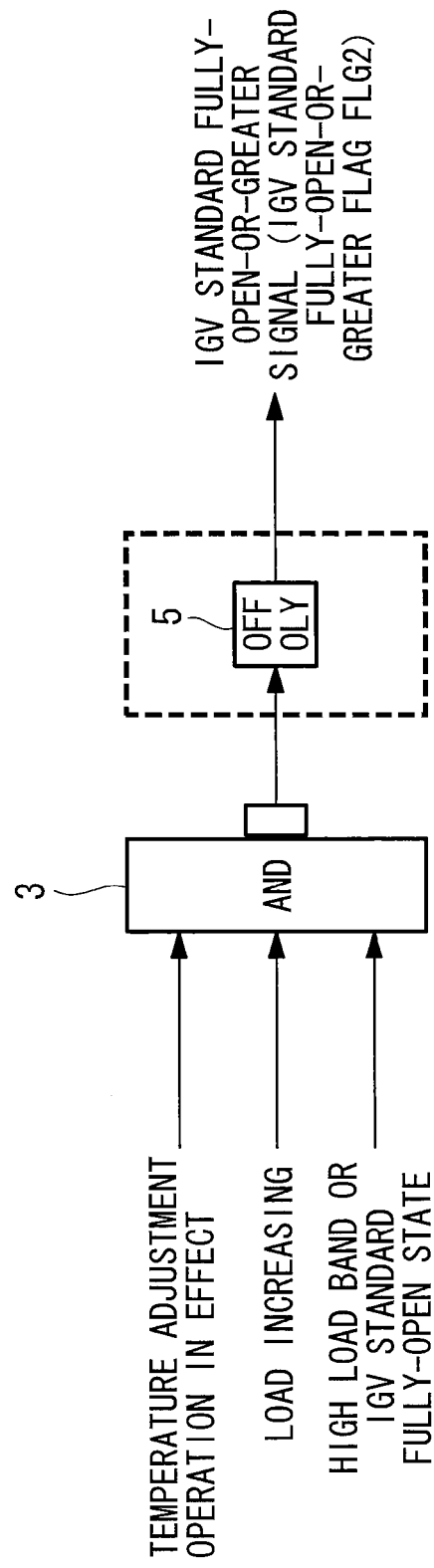
FIG. 13 is a specific configuration diagram of an IGV control flag generator according to a sixth embodiment of the present invention.

Next, a gas turbine operation control device according to a sixth embodiment of the present invention will be described, referring to FIG. 13. Here, FIG. 13 is a specific configuration diagram of the IGV control flag generator 115 of the sixth embodiment of the present invention. Further, the overall configuration of the gas turbine operation control device and the configuration of the fuel controller 112 are equivalent to those of the first to fourth embodiments (FIGS. 1, 2, 6, 7, etc.), and also the configuration of the IGV controller 113 is equivalent to that of the fifth embodiment (FIG. 12B); and thus, descriptions of the individual components will be omitted.

In the IGV control flag generator 115, as in the fifth embodiment, the AND gate 1 generates the IGV emergency fully-open flag, FLG, and the AND gate 3 generates the IGV standard fully-open-or-greater flag, FLG2; however, as shown in FIG. 13, in the configuration, an off delay 5 is added to the output of the AND gate 3.

When the condition for generating the IGV standard fully-open-or-greater flag, FLG2, is switched by the off delay 5 from active to inactive, it is possible to deactivate the IGV standard fully-open-or-greater flag, FLG2, with a fixed amount of delay. Accordingly, an advantage equivalent to that of the fifth embodiment is afforded, and effects of switching back from the IGV emergency fully-open state, such as an output reduction and the like, can be prevented.

[Modifications]

Although the embodiments of the present invention have been described above, referring to the drawings, the specific configurations are not limited to these embodiments, and design modifications and the like that do not depart from the spirit of the present invention are also encompassed.

In the fifth embodiment and the sixth embodiment, whether the temperature adjustment operation is in effect is determined based on whether or not the blade path temperature setting value, BPCSO, or the exhaust gas temperature setting value is being used, in the fuel controller 112 as the final control signal for the fuel flow rate adjusting valve 105; however, the determination may be made based on a difference between the target value of the blade path temperature, BPREF, and the measured value of the blade path temperature, BPT, or a difference between the target value of the exhaust gas temperature and the measured value of the exhaust gas temperature.

For example, when the measured value of the blade path temperature, BPT, is increasing, approaching the target value of the blade path temperature, BPREF, it is expected that the temperature adjustment operation will eventually begin; however, if it is determined that the temperature adjustment operation is in effect when the difference between the target value of the blade path temperature, BPREF, and the measured value of the blade path temperature, BPT, is below a predetermined value, the IGV standard fully-open-or-greater flag, FLG2, is activated in advance, expediting the transition of the inlet guide vane 104 to the emergency fully-open state, and thereby, the load responsiveness (trackability) can be further improved.

In addition, whether the temperature adjustment operation is in effect or not may be determined using the turbine inlet temperature. Note that, because the turbine inlet temperature is not directly measured, an alternative index is used. More specifically, for example, with "the gas turbine combustion control device" in Japanese Unexamined Patent Application, Publication No. 2007-77867, a technique is disclosed for calculating a combustion load command value (CLCSO), which is proportional to the turbine inlet temperature, based on the gas turbine output, the degree of opening of the inlet guide vane 104, and the intake air temperature of the compressor 102; this combustion load command value (CLCSO) can be used as an alternative index. For example, the determination regarding whether the temperature adjustment operation is in effect is carried out when the combustion load command value (CLCSO) is at or above a predetermined value (for example, 98[%]).

Using the turbine inlet temperature (or an alternative index) in this way enables operation in which the turbine inlet vane 104 is shifted into the emergency fully-open state at the point where the turbine inlet temperature is critical, allowing for more delicate control.

The invention claimed is:

1. An operation control device for a gas turbine that drives a generator by rotating a turbine with combustion gas generated in a combustor by supplying the combustor with fuel and compressed air from a compressor provided with an inlet guide vane at a front stage, the operation control device for a gas turbine comprising:
   an inlet guide vane (IGV) control flag generator configured to activate an inlet guide vane emergency fully-open flag when a system frequency drops to or below a predetermined threshold value and an output of the generator is in a load band at or above a predetermined value, or when the system frequency drops to or below the predetermined threshold value and a degree of opening of the inlet guide vane is set to a predetermined standard fully-open degree of opening;
   an inlet guide vane degree-of-opening setting portion configured to, when the inlet guide vane emergency fully-open flag is active, set the degree of opening of the inlet guide vane to an emergency fully-open degree of opening, which is greater than the standard fully-open degree;
   a temperature controller configured to generate an exhaust gas temperature setting value or a blade path temperature setting value for the turbine; and
   a fuel controller configured to control an amount of fuel to be supplied to the combustor based on the exhaust gas temperature setting value or the blade path temperature setting value;
   wherein the temperature controller includes:
   a switching portion configured to switch functions in accordance with the degree-of-opening of the inlet guide vane;
   a setting portion configured to set a temperature adjustment setting by using the function set by the switching portion;
   a setting value generation portion configured to generate the exhaust gas temperature setting value or the blade path temperature setting value for the turbine by using the temperature adjustment setting set by the setting portion.

2. The operation control device for a gas turbine according to claim 1, wherein
   the fuel controller has a load limit controller configured to generate a load limit setting value that determines the amount of fuel to be supplied based on the output of the generator, or a governor controller configured to generate a governor setting value that determines the amount of fuel to be supplied based on a rotational speed of the gas turbine, and
   the fuel controller controls the amount of fuel supplied to the combustor based on the load limit setting value, the governor setting value, the exhaust gas temperature setting value, or the blade path temperature setting value; and
   the load limit controller or the governor controller sets an upper limit setting and a rate-of-change setting for the output of the generator a predetermined value, when the inlet guide vane emergency fully-open flag is active.

3. The operation control device for a gas turbine according to claim 1, wherein the temperature controller includes a first correction portion that calculates a rate of change of the degree of opening of the inlet guide vane, calculates a correction amount corresponding to the rate of change, and corrects the temperature adjustment setting that is set by the setting portion in accordance with the degree of opening of the inlet guide vane.

4. The operation control device for a gas turbine according to claim 1, wherein the temperature controller includes a second correction portion configured to calculate a rate of change of the degree of opening of the inlet guide vane, calculate a correction amount corresponding to the rate of change, and correct the exhaust gas temperature setting value or the blade path temperature setting value of the turbine generated by the setting value generation portion.

5. The operation control device for a gas turbine according to claim 3, wherein the first correction portion is operated when the degree of opening of the inlet guide vane falls within a predetermined range.

6. The operation control device for a gas turbine according to claim 1, wherein the temperature controller includes a PI controller that generates the exhaust gas temperature setting value or the blade path temperature setting value of the turbine by carrying out proportional integration control based on a difference between a target value based on the temperature adjustment setting and a measured exhaust gas temperature or a blade path temperature, and, when the inlet guide vane emergency fully-open flag is active, control parameters in the PI controller are set to predetermined values.

7. The operation control device for a gas turbine according to claim 1, wherein the inlet guide vane control flag generator activates an inlet guide vane standard fully-open-or-greater flag when temperature adjustment operation is in effect based on the temperature controller, the output of the generator is increasing, and the output of the generator is in the load band at or above the predetermined value, or when temperature adjustment operation is in effect based on the temperature controller, the output of the generator is increasing, and the degree of opening of the inlet guide vane is in the standard fully-open state; and
   the inlet guide vane degree-of-opening setting portion sets the degree of opening of the inlet guide vane to the predetermined degree of opening, when the inlet guide vane emergency fully-open flag or the inlet guide vane standard fully-open-or-greater flag is active.

8. The operation control device for a gas turbine according to claim 7, wherein the inlet guide vane control flag generator deactivates the inlet guide vane standard fully-open-or-greater flag with a fixed amount of delay, when a generation condition of the inlet guide vane standard fully-open-or-greater flag switches from active to inactive.

9. The operation control device for a gas turbine according to claim 7, wherein the inlet guide vane control flag generator carries out determination of whether the temperature adjustment operation is in effect when the difference between a target value based on the temperature adjustment setting of the temperature controller and the measured exhaust gas temperature or the blade path temperature drops to or below a predetermined value.

10. The operation control device for a gas turbine according to claim 7, wherein the inlet guide vane control flag generator carries out determination of whether the temperature adjustment operation is in effect when a turbine inlet temperature is within a predetermined range.

11. The operation control device for a gas turbine according to claim 4, wherein the second correction portion is operated when the degree of opening of the inlet guide vane falls within a predetermined range.

12. An operation control method for a gas turbine that drives a generator by rotating a turbine with combustion gas generated in a combustor by supplying the combustor with fuel and compressed air from a compressor provided with an inlet guide vane at a front stage, the operation control method for a gas turbine comprising:
- an inlet guide vane (IGV) control flag generation step of activating an inlet guide vane emergency fully-open flag when a system frequency drops to or below a predetermined threshold value, and the generator output is in a load band at or above a predetermined value, or when the system frequency drops to or below a predetermined value, and the degree of opening of the inlet guide vane is set to a predetermined standard fully-open degree of opening;
- an inlet guide vane degree-of-opening setting step of setting the degree of opening of the inlet guide vane to an emergency fully-open degree of opening which is greater than the standard fully-open degree, when the inlet guide vane emergency fully-open flag is activated;
- a temperature control step of generating an exhaust gas temperature setting value or a blade path temperature setting value; and
- a fuel control step of controlling an amount of fuel to be supplied to the combustor based on the exhaust gas temperature setting value or the blade path temperature setting value; and wherein the temperature control step includes:
- a switching step of switching functions in accordance with the degree-of-opening of the inlet guide vane;
- a setting step of setting a temperature adjustment setting by using the function set by the switching step;
- a setting value generating step of generating the exhaust gas temperature setting value or the blade path temperature setting value for the turbine by using the temperature adjustment setting set by the setting step.

* * * * *